(12) United States Patent
Kai et al.

(10) Patent No.: US 7,366,426 B2
(45) Date of Patent: Apr. 29, 2008

(54) OPTICAL ADD/DROP MULTIPLEXER USING TUNABLE FILTER AND METHOD FOR FEEDBACK CONTROLLING THE TUNABLE FILTER

(75) Inventors: Yutaka Kai, Kawasaki (JP); Hideyuki Miyata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 457 days.

(21) Appl. No.: 10/787,137

(22) Filed: Feb. 27, 2004

(65) Prior Publication Data

US 2004/0197099 A1   Oct. 7, 2004

(30) Foreign Application Priority Data

Feb. 27, 2003  (JP)  ............... 2003-051741

(51) Int. Cl.
*H04B 10/04* (2006.01)
*H04B 10/12* (2006.01)

(52) U.S. Cl. ...................... 398/195; 398/192
(58) Field of Classification Search ............ 398/85, 398/195; 372/20; 250/227, 23
See application file for complete search history.

(56) References Cited

U.S. PATENT DOCUMENTS

| | | | | |
|---|---|---|---|---|
| 5,552,919 A * | 9/1996 | Majima et al. | ............ | 398/213 |
| 6,262,822 B1 * | 7/2001 | Obhi et al. | ............ | 398/9 |
| 6,351,323 B1 | 2/2002 | Onaka et al. | | |
| 6,407,376 B1 * | 6/2002 | Korn et al. | ............ | 250/227.23 |
| 6,441,933 B1 * | 8/2002 | Jang | ............ | 398/79 |
| 6,597,480 B1 * | 7/2003 | Iida et al. | ............ | 398/79 |
| 6,748,179 B2 * | 6/2004 | Lange et al. | ............ | 398/177 |
| 6,845,108 B1 * | 1/2005 | Liu et al. | ............ | 372/20 |
| 6,888,856 B2 * | 5/2005 | Green et al. | ............ | 372/20 |
| 7,024,116 B2 * | 4/2006 | Orbach et al. | ............ | 398/83 |
| 2002/0101633 A1 * | 8/2002 | Onaka et al. | ............ | 359/119 |
| 2002/0118459 A1 | 8/2002 | Kuznetsov | | |
| 2002/0126348 A1 * | 9/2002 | Lange et al. | ............ | 359/124 |
| 2003/0007522 A1 * | 1/2003 | Li et al. | ............ | 372/20 |
| 2003/0202190 A1 * | 10/2003 | Atia et al. | ............ | 356/519 |
| 2004/0091002 A1 * | 5/2004 | Watterson et al. | ............ | 372/20 |

(Continued)

FOREIGN PATENT DOCUMENTS

JP    8-288932    11/1996

(Continued)

OTHER PUBLICATIONS

Communication—European Search Report for European Application No. 04004430.7-2415- dated Jun. 16, 2006.

(Continued)

*Primary Examiner*—Kenneth Vanderpuye
*Assistant Examiner*—Thi Q. Le
(74) *Attorney, Agent, or Firm*—Staas & Halsey LLP

(57) ABSTRACT

A wavelength stabilizing filter has a wavelength transmission characteristic curve that has its peak in a wavelength located between a first continuous set band and a second continuous set band longer in wavelength than the first set band, and that linearly drops from the peak toward the shorter wavelength side than the first set band and also toward the longer wavelength side longer than the second set band. A control unit generates a control signal needed to enable an optical tunable filter to extract signal light with a predetermined wavelength from an inputted WDM signal, based on light transmitted through the wavelength stabilizing filter.

12 Claims, 21 Drawing Sheets

U.S. PATENT DOCUMENTS

2006/0193354 A1 * 8/2006 Rosenblatt ............. 372/29.023

FOREIGN PATENT DOCUMENTS

| JP | 11-218790 | 8/1999 |
| JP | 11-282296 | 10/1999 |
| JP | 11-289296 | 10/1999 |
| JP | 2000-241782 | 9/2000 |

OTHER PUBLICATIONS

Communication—Partial European Search Report for European Application No. 04004430.7-2415 dated Apr. 19, 2006.

European Patent Office Action, dated Sep. 29, 2006, and issued in related European Patent Application No. 04 004 430.7—2415.

* cited by examiner

| GRID NO. | ITU GRID FREQUENCY (GHz) | ITU GRID WAVELENGTH (nm) | WAVELENGTH STABILIZING FILTER MONITORED POWER VALUE (NORMALIZED) |
|---|---|---|---|
| C6 | 196500 | 1525.66 | 0.000 |
| C7 | 196400 | 1526.44 | 0.015 |
| C8 | 196300 | 1527.21 | 0.030 |
| ⋮ | ⋮ | ⋮ | ⋮ |
| C54 | 191700 | 1563.86 | 0.920 |
| C55 | 191600 | 1564.68 | 0.935 |
| L01 | 191500 | 1565.50 | 0.950 |
| L02 | 191400 | 1566.31 | 0.965 |
| L03 | 191300 | 1567.13 | 0.980 |
| L04 | 191200 | 1567.95 | 0.981 ← WAVELENGTH STABILIZER FILTER PEAK |
| L05 | 191100 | 1568.77 | 0.973 |
| ⋮ | ⋮ | ⋮ | ⋮ |
| L52 | 186400 | 1608.33 | 0.032 |
| L53 | 186300 | 1609.20 | 0.016 |
| L54 | 186200 | 1610.06 | 0.000 |

FIG. 9

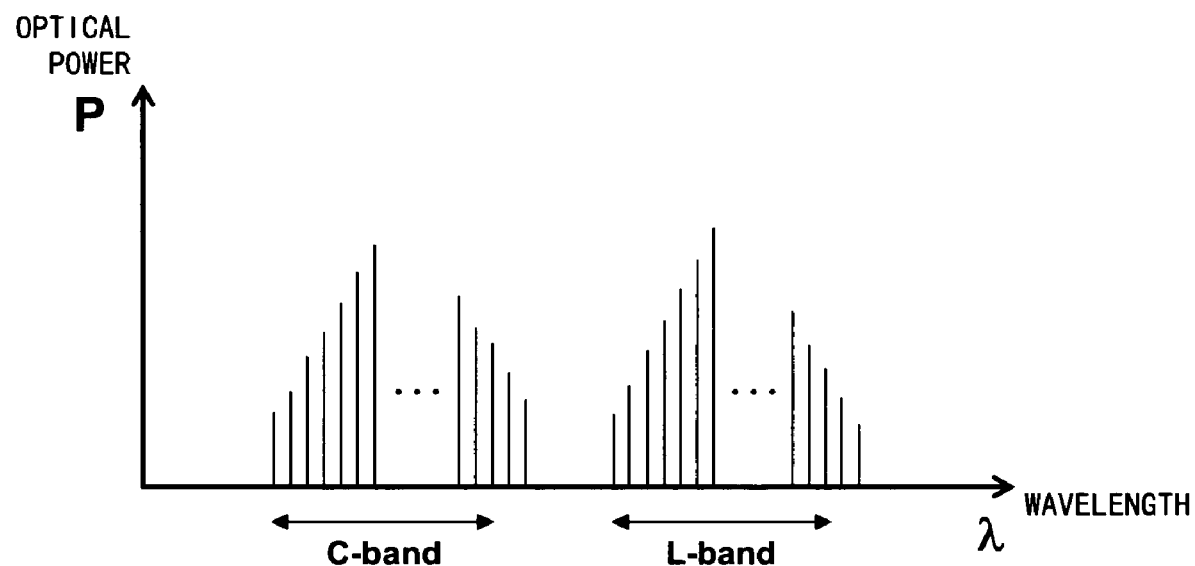
F I G. 1 5

OPTICAL ADD/DROP MULTIPLEXER USING TUNABLE FILTER AND METHOD FOR FEEDBACK CONTROLLING THE TUNABLE FILTER

BACKGROUND OF THE INVENTION

1. Field of the Invention

The present invention relates to a WDM (wavelength-division multiplexing) optical communication technology and particularly it relates to a technology for controlling an optical tunable filter needed to extract signal light with a specific wavelength from a plurality of segments of signal light multiplexed by a WDM method, each with a different wavelength.

2. Description of the Related Art

With the explosive increase of a data communication demand centered on Internet traffic, a large capacity and super-long haul backbone network is required. In that case, since a variety of user services are required, the realization of a highly reliable, flexible and economical network is also required.

By the progress of a wavelength-division multiplexing transmission technology and an optical amplification technology, recently transmission capacity and transmission distance have been remarkably increased and transmission line cost has also been reduced. However, if a conventional optical/electric conversion system or an electric switching system is adopted in order to follow a high-speed and large capacity signal and to increase the information processing capability of a network node, a node cost increases and the size of a node device also increases. In such a background, the development of an optical add drop multiplexer (OADM) and an optical cross connect (OXC) device, which replaces a large-scale electronic circuit with an optical device in an optical communication system in order to reduce the cost and size of a node, and performs a variety of processes of data in units of optical paths in an optical wavelength area, is expected.

In these devices, a lot of optical functional devices, such as an optical switch for turning signal light on/off, attenuating signal light and performing the 1×n switching of signal light, etc., a wavelength filter for distributing signal light for each wavelength and the like are used.

Of these optical function devices, an optical wavelength selecting device (hereinafter in this specification, called an "optical tunable filter") that can select signal light with a desired wavelength from a WDM signal is a major key device for realizing such an OADM. Such an optical tunable filter includes an acousto-optic tunable filter (AOTF).

FIG. 1 shows a network configuration of an OADM node, and FIG. 2 shows a configuration of an OADM using an AOTF.

In FIG. 1, a network A, 1001 and a network B, 1002 are overlapped in node 1, and the OADM of node 1 drops three segments of signal light each with one of wavelengths $\lambda_1$, $\lambda_4$ and $\lambda_6$, of WDM signal light consisting of six segments of signal light each with one of wavelengths $\lambda_1$ through $\lambda_6$ transmitted from the node n in network A, 1001, from network A, 1001, and transmits them to the node 2 of network B, 1002. Three segments of signal light each with one of wavelengths $\lambda_2$, $\lambda_3$ and $\lambda_5$ are transmitted through the OADM to the node 2 of network A, 1001.

The network shown in FIG. 2 is a ring-structured network. The network comprises a running system (working system, indicated as system W), which is actually used, and a stand-by system (protection system, indicated as system P), which is used when system W fails. Since the respective configurations of systems W and P are the same, only the configuration of system W is described here. Although system W shown in FIG. 2 comprises three OADMs of OADM 1 (W), OADM 2 (W) and OADM 3 (W), they have the same configuration. Therefore, only the configuration of OADM 1 (W) is described here. An amplified spontaneous emission (ASE) suppression filter 2000 inserted in the middle of system W or P eliminates natural light noise (white noise) that is generated and accumulated by each amplifier existing in the ring-structured network.

WDM signal light transmitted to OADM1 (W) from OADM3 (W) is amplified up to a predetermined size by an amplifier 2001, and then is inputted to a photo-coupler (CPL) 2002. Although the signal light transmitted through the CPL 2002 is inputted to a rejection AOTF 2003, part of signal light demultiplexed by the CPL 2002 is inputted to an amplifier 2004. The signal light amplified by the amplifier 2004 is demultiplexed into a plurality of segments of signal light by a CPL 2005, and each demultiplexed are inputted to a drop AOTF 2006. The drop AOTF 2006 extracts signal light with a desired wavelength from the WDM signal light. The extracted signal light is designated as the drop output of the OADM 1 (W).

Then, this signal light from the OADM 1(W) is transmitted through an optical switch (OSW) 2100 for switching a system from W to P or vice versa, is inputted to a transponder 2200 and is demodulated.

The signal (ADD input signal) transmitted to the network from this node is, firstly, optically modulated by a tunable transponder 2300 to signal light with a predetermined wavelength. Then, the signal is inputted to the OADM 1 (W) through an OSW 2400. This signal light is multiplexed with signal light with a different wavelength transmitted from the node by a CPL 2007. The signal light multiplexed by the CPL 2007 is amplified up to a predetermined size by an amplifier 2008, and is inputted to a CPL 2009. Then, the signal light is inserted in the signal light transmitted without being blocked by the rejection AOTF 2003, of the signal light from the OADM 3 (W), and both are multiplexed. The signal light multiplexed by the CPL 2009 is amplified up to a predetermined size by an amplifier 2010 and then is transmitted toward the OADM 2 (W).

The signal light wavelength selecting characteristics of the rejection AOFT 2003 and the drop AOTF 2006 are controlled by a control unit (MC) 2011, based on information provided by a monitor/control system 3000 monitoring the operation of the entire network shown in FIG. 2.

As described above, an OADM node must have a function to insert (add) signal light with a desired wavelength in (to) light that is transmitted through a node, a function to drop (extract) signal light with a desired wavelength from light that is transmitted through a node and a function to block signal light transmitted through a node. Sometimes a function to collectively drop signal light is needed. This function is required in a node where two or more ring-structured networks or general networks are overlapped, and is used to transmit signal light consisting of a plurality of segments of signal light each with a different wavelength, from one network to another network. Sometimes a function to collectively block signal light is also needed. This function blocks signal light with a wavelength to be terminated, of multiplexed light transmitted through a node and a plurality of segments of signal light each with a wavelength that has the same wavelength element.

An OADM using an AOTF is, for example, disclosed by Japanese Patent Laid-open Nos. 11-218790, 11-289296 and 2000-241782.

In an OADM node, it is important for signal light with an arbitrary wavelength to be able to be demultiplexed and inserted for the purpose of the flexible operation of a network. For that purpose, it is necessary to apply the above-mentioned collective process to signal light with an arbitrary wavelength, and from this point of view, a device, such as an AOTF having a function to freely change a wavelength to be selected is useful. If signal light with a desired wavelength is selected and demultiplexed using this function to freely change a wavelength to be selected, the transmission center of the filtering characteristic of such a device must completely coincide with the desired signal light wavelength. If the transmission center wavelength does not coincide with a signal light wavelength, for example, in the drop (extraction) process, insertion loss increases or signal light with another wavelength is wrongly dropped, which is the fatal problem of an OADM device.

Generally, the wavelength of light emitted from a laser diode (LD), being a transmitting light source, fluctuates, and the transmission center wavelength of such a device for providing a filter characteristic also fluctuates due to a change with an elapse of time, an environmental change, a control error and the like. Therefore, in order to stabilize the operation of an OADM device, it is indispensable to detect a wavelength fluctuation error and to track it to perform feedback control. In the case of a drop process, in this tracking, dropped signal light is demultiplexed and designated as monitor light. Then, the monitor light is detected and its power value is controlled so as to become a maximum. Usually a method for controlling by checking only the magnitude of the receiving optical power of the monitor light, which is disclosed by Japanese Patent Laid-open No. 8-288932, is most economical and efficient.

However, since an AOTF has a selected wavelength fluctuation characteristic that is sensitive to ambient temperature, for example, a temperature change of only 1° C. leads to a 100 GHz difference in a selected wavelength, the optimal frequency of an RF (high frequency) signal to be applied to determine a wavelength to be selected is not uniquely related to the wavelength to be selected, and a wavelength to be selected varies due to fluctuations in ambient temperature. For example, although an AOTF selects a wavelength of 1,550 nm if an RF signal of 170 MHz is applied at ambient temperature of 25° C., it selects a wavelength of 1,558 nm if the same RF signal of 170 MHz is applied at ambient temperature of 35° C. Since the optimal frequency of an RF signal to be applied to an AOTF varies depending on ambient temperature, the AOTF sometimes wrongly selects signal light with a different wavelength in selecting a signal with one arbitrary wavelength from a WDM signal, and continues to select the wrong signal light by the earlier-mentioned tracking control.

If the wavelength band of a WDM signal is approximately 40 nm, such as only the first continuous set band, a so-called "C band" (center wavelength band: approximately 1,525 nm-1,565 nm, although there are a variety of definitions) or only the second set band, which is a continuous wavelength band longer than the first set band, a so-called "L band" (long wavelength band: approximately 1,570 nm-1,610 nm, although there are a variety of definitions), signal light with a desired wavelength can also be selected by actually measuring the optimal frequency of an RF signal to be applied to the AOTF to transmit light signal with a predetermined wavelength in such a band in the operating environment of the OADM, computing an RF signal with an optimal frequency needed to transmit optical signals with other frequencies in the band by interpolation and the like, based on the detected result, and applying a signal with the computed frequency. At this time, tracking control can also be started.

However, for example, if one optical tunable filter selects signal light from a band including both C and L bands, that is, 85 nm between 1,525 nm and 1,610 nm, in the above-mentioned method, there is a possibility of selecting a signal with a wrong wavelength.

More specifically, for example, when an AOTF selects signal light with one arbitrary wavelength from a WDM signal in which signals are arrayed at intervals of 100 GHz, signal light to be selected can be switched to adjacent signal light only by changing the frequency of an RF signal to be applied by approximately 100 kHz. For example, if an RF signal of 170.0 MHz must be applied to the AOTF in order to select signal light of channel 10, in order to select the signal light of channel 11, that is, an adjacent channel 100 GHz away from the channel 10, an RF signal of 169.9 MHz must be applied.

In other words, in a WDM signal including only a C or L band, the change frequency range of an RF signal to be applied to select a signal with one wavelength from each of all 44 channels, which are a plurality of segments of signal light arrayed at wavelength intervals of 0.8 nm (at frequency intervals of 100 GHz) is computed as follows:

(44−1)×100 kHz=4.3 MHz

In order to control the AOTF so as not to actually select an adjacent channel signal light, the optimal frequency of an RF signal must be computed with the accuracy allowance of ±40 kHz. Therefore, an allowable error rate is 40 kHz/4.3 MHz=0.93% and the optimal frequency error rate must be approximately ±1%. In the above-mentioned method of computing the optimal frequency of an RF signal to be applied to the AOTF, this accuracy can be secured, but it almost reaches its limit.

However, if the AOTF selects signal light from a band including both C and L bands, the change frequency range of an RF signal to be applied to select a signal with one wavelength from this band is computed as follows, since a plurality of segments of signal light are arrayed at wavelength intervals of 0.8 nm in a band of 85 nm:

85/0.8×100 kHz=approximately 10.6 MHz

The allowable frequency error rate of an RF signal to be applied for the first time with the accuracy of ±40 kHz must be 40 kHz/10.6 MHz=0.038%. In other words, the frequency of an RF signal to be applied for the first time must be obtained with an error rate of approximately ±0.4%. In the above-mentioned method of computing the optimal frequency of an RF signal to be applied to the AOTF, it is very difficult to secure this accuracy.

SUMMARY OF THE INVENTION

It is an object of the present invention to provide a method for controlling an optical tunable filter so as not to wrongly select a signal with a different wavelength when selecting a signal with a desired wavelength from a wavelength-division multiplexed (WDM) signal using the optical tunable filter.

The optical transmission device in the first aspect of the present invention comprises: an optical tunable filter which transmits and extracts signal light with a specific wavelength from signal light multiplexed by a wavelength division multiplexing (WDM) method and whose wavelength transmission characteristic varies depending on a control signal; a light transmission filter to which signal light extracted by the optical tunable filter is inputted and which has a wavelength transmission characteristic curve that has its peak in a wavelength located between a first continuous set band and a second continuous set band longer in wavelength than the first set band, and that linearly drops from the peak toward a shorter wavelength side than the first set band and also toward a longer wavelength side than the second set band; and a control signal generating unit generating a control signal needed to enable the optical tunable filter to extract the signal light with a desired wavelength, based on the light transmitted through the light transmission filter.

In this case, the first and second set bands are, for example, a wavelength band between 1,525 nm and 1,565 nm and one between 1,570 nm and 1,610 nm, respectively. The peak of the wavelength transmission curve, for example, exists in a wavelength band between 1,565 nm and 1,570 nm.

Since in the above-mentioned configuration, the wavelength transmission characteristic of the light transmission filter is already known, the optical strength of signal light with a desired wavelength properly extracted by the optical tunable filter that is detected after being transmitted through the light transmission filter is known in advance. Therefore, the wavelength transmission characteristic of the optical tunable filter can be shifted by changing a control signal generated by the control signal generating unit. If the strength of signal light after being transmitted through the light transmission filter becomes a predetermined value in the course of shifting this wavelength transmission characteristic, a control signal then is a control signal needed to extract signal light with a desired wavelength. Then, by applying this control signal to the optical tunable filter, signal light with a desired wavelength can be extracted.

Since the light transmission filter having this configuration has the above-mentioned wavelength transmission characteristic, the change range of a control signal to be changed to detect the coincidence between the strength of signal light and the above-mentioned predetermined value can be narrowed if the control signal generating unit determines to which the signal light with a desired wavelength belongs, to the first or second set band. By narrowing the change range of the control signal thus, the determination accuracy of a control signal needed to extract signal light with a desired wavelength can be improved and time needed to determine the control signal needed to extract signal light with a desired wavelength can be reduced.

In the above-mentioned optical transmission device of the present invention, the light transmission filter further can also have a wavelength transmission characteristic of blocking signals out of a wavelength band in which the multiplexed signal light to be inputted to the optical tunable filter exists.

Since, for example, ASE (amplified spontaneous emission) noise, which is natural optical noise that is generated and accumulated by each amplifier in a ring-structured network, can be blocked thus, the wrong determination of a control signal needed to extract signal light with a desired wavelength due to such noise can be prevented.

The above-mentioned optical transmission device of the present invention further can also comprise a first optical strength detecting unit detecting the optical strength of light transmitted through the light transmission filter and a storage unit storing information indicating the wavelength transmission characteristic of the light transmission filter. In this case, the control signal generating unit generates the control signal, based on both the optical strength detected by the first optical strength detecting unit when shifting the wavelength transmission characteristic of the optical tunable filter across the entire wavelength band including all segments of multiplexed signal light and the information stored in the storage unit.

According to this configuration, the control signal generating unit can obtain the strength of signal light with a desired wavelength that has been transmitted through both the optical tunable filter and the light transmission filter from the first strength detecting unit and also can obtain the wavelength transmission characteristic of the light transmission filter from the information stored in the storage unit. Therefore, by doing as described above, a control signal needed to extract the signal light with a desired wavelength can be determined, and then, the signal light can be extracted by applying this control signal to the optical tunable filter.

This configuration can also further comprise a second optical strength detecting unit detecting the strength of light transmitted through the optical tunable filter. In this case, the control signal generating unit generates the control signal, based on both the respective optical strength detected by the first and second optical strength detecting units when shifting the wavelength transmission characteristic of the optical tunable filter across the entire wavelength band including all segments of multiplexed signal light and the information stored in the storage unit.

According to this configuration, a control signal needed to extract signal light with a desired wavelength can be properly determined by comparing the normalized optical strength detected by the first optical strength detecting unit, which is normalized by the optical strength detected by the second optical strength detecting unit, and the information stored in the storage unit even if the optical power of signal light in a WDM signal inputted to the optical tunable filter fluctuates. Therefore, by applying this control signal to the optical tunable filter then, signal light with a desired wavelength can be extracted.

The earlier-mentioned optical transmission device of the present invention can also further comprise a first optical strength detecting unit detecting the strength of light transmitted through the light transmission filter, a third optical strength detecting unit detecting the strength of reflected light which is extracted from the light transmission filter when signal light is inputted to the light transmission filter and which has a reflection characteristic, being the reversal of a wavelength transmission characteristic that is given to light transmitted through the light transmission filter. In this case, the control signal generating unit generates the control signal, based on the respective optical strength detected by the first and third optical strength detecting units.

According to this configuration, since a control signal is generated using both the optical strength detected by the first and third optical strength detecting units, the change range of strength can be more widely used than the case where only one of them is used. Therefore, the setting accuracy of a control signal to be applied to enable the optical tunable filter to extract signal light with a desired wavelength can be improved.

In order to extract signal light with a desired wavelength, this configuration can further comprise a storage unit storing information indicating the difference for each wavelength between the wavelength transmission characteristic and the reflection characteristic of the light transmission filter. In this case, the control signal generating unit can generates the control signal, based on both a difference in detected optical strength between the first and third optical strength detecting units and the information stored in the storage unit.

The optical transmission device in the second aspect of the present invention comprises: an optical tunable filter which transmits and extracts signal light with a specific wavelength from signal light multiplexed by a wavelength division multiplexing (WDM) method and whose wavelength transmission characteristic varies depending on a control signal; a light transmission filter to which signal light extracted by the optical tunable filter is inputted, which has the bottom of a transmission characteristic curve in a wavelength located between the first continuous set band and the second continuous set band longer in wavelength than the first set band, and has a wavelength transmission characteristic curve that linearly rises from the bottom toward the wavelength side shorter than the first set band and also toward the wavelength side longer than the second set band; and a control signal generating unit generating a control signal needed to enable the optical tunable filter to extract signal light with a desired wavelength, based on the light transmitted through the light transmission filter.

Although this configuration differs from the above-mentioned configuration in the wavelength transmission characteristic of the light transmission filter, it can also execute the same function as the above-mentioned one, thus extracting signal light with a desired wavelength. Furthermore, if the control signal generating unit determines to which the signal light with a desired wavelength belongs, to the first or second set band, the change range of a control signal to be changed to detect the coincidence between the strength of signal light and the above-mentioned predetermined value can be narrowed. Therefore, the determination accuracy of a control signal needed to detect the signal light with a desired wavelength can be improved, and also time needed to determine the control signal can be reduced.

The optical transmission device in the third aspect of the present invention comprises: an optical tunable filter which transmits and extracts signal light with a specific wavelength from signal light multiplexed by a wavelength division multiplexing (WDM) method and whose wavelength transmission characteristic varies depending on a control signal; a light transmission filter to which signal light extracted by the optical tunable filter is inputted, and which has a wavelength transmission characteristic curve that has its respective peaks of the center wavelength in the first continuous set band and of the center wavelength in the second continuous set band longer in wavelength than the first set band, and that linearly drops from each peak toward a wavelength between the first and second set bands, also from the peak of the center wavelength in the first set band toward the shorter wavelength side than the first set band, and also from the peak of the center wavelength in the second set band toward the wavelength longer side than the second set band; and a control signal generating unit generating a control signal needed to enable the optical tunable filter to extract signal light with a desired wavelength, based on the light transmitted the light transmission filter.

Although this configuration differs from the earlier-mentioned configuration in the wavelength transmission characteristic of the light transmission filter, it can also execute the same function as the earlier-mentioned ones, thus extracting signal light with a desired wavelength. Furthermore, if the control signal generating unit determines to which the signal light with a desired wavelength belongs, to the first or second set band and furthermore, toward which the signal light with a desired wavelength is located, toward the long or short wavelength side of a set band to which it belongs, the change range of a control signal to be changed to detect the coincidence between the strength of signal light and the above-mentioned predetermined value can be narrowed. Therefore, the determination accuracy of a control signal needed to detect the signal light with a desired wavelength can be improved, and also time needed to determine the control signal can be reduced.

The optical transmission device in the fourth aspect of the present invention comprises: an optical tunable filter which transmits and extracts signal light with a specific wavelength of signal light multiplexed by a wavelength division multiplexing (WDM) method and whose wavelength transmission characteristic varies depending on a control signal; a light transmission filter to which signal light extracted by the optical tunable filter is inputted, and which has a wavelength transmission characteristic curve that has its bottoms in the center wavelength of the first continuous set band and in the center wavelength of the second continuous set band longer in wavelength than the first set band, and that linearly rises from each bottom toward a wavelength located between the first and second set bands, also from the bottom of the center wavelength in the first set band toward the wavelength side shorter than the first set band, and also from the bottom of the center wavelength in the second set band toward the wavelength side longer than the second set band; and a control signal generating unit generating a control signal needed to enable the optical tunable filter to extract signal light with a desired wavelength, based on the light transmitted through the light transmission filter.

Although this configuration differs from the earlier-mentioned configuration in the wavelength transmission characteristic of the light transmission filter, it can also execute the same function as the earlier-mentioned ones, thus extracting signal light with a desired wavelength. Furthermore, if the control signal generating unit determines to which the signal light with a desired wavelength belongs, to the first or second set band and furthermore, toward which the signal light with a desired wavelength is located, toward the long or short wavelength side of a set band to which it belongs, the change range of a control signal to be changed to detect the coincidence between the strength of signal light and the above-mentioned predetermined value can be narrowed. Therefore, the determination accuracy of a control signal needed to detect the signal light with a desired wavelength can be improved, and also time needed to determine the control signal can be reduced.

The above-mentioned optical transmission device in the third or fourth aspect of the present invention can also further comprise a first optical strength detecting unit detecting the strength of light transmitted through the light transmission filter and a storage unit storing information indicating the wavelength transmission characteristic of the light transmission filter. In this case, the control signal generating unit generates the control signal, based on both the optical strength detected by the first optical strength detecting unit when shifting the wavelength transmission characteristic of the optical tunable filter across the entire wavelength band including all segments of multiplexed signal light and the information stored in the storage unit.

According to this configuration, the control signal generating unit can obtain the strength of signal light with a desired wavelength that has been transmitted through both the optical tunable filter and the light transmission filter from the first strength detecting unit and also can obtain the wavelength transmission characteristic of the light transmission filter from the information stored in the storage unit.

Therefore, by doing as described earlier, a control signal needed to extract the signal light with a desired wavelength can be determined, and then the signal light can be extracted by applying this control signal to the optical tunable filter.

In the earlier-mentioned optical transmission device in the first aspect of the present invention, the light transmission filter can also include a wavelength transmission characteristic curve which has its bottom in a wavelength located between the first set band and a third continuous set band that is shorter in wavelength than the first set band and that linearly rises from the bottom toward the peak in a wavelength located between the first and second set bands and also toward the shorter wavelength side than the third set band.

Here, the first, second, and third set bands are, for example, a wavelength band between 1,525 nm and 1,565 nm, a wavelength band between 1,570 nm and 1,610 nm, and a wavelength band between 1,480 nm and 1,520 nm, respectively. The peak of the transmission characteristic in a wavelength located between the first and second set bands and the bottom in a wavelength located between the first and third set bands can also be located within a wavelength bands, for example, of 1,565 nm through 1,570 nm and 1,520 nm through 1,525 nm, respectively.

Although this configuration differs from the earlier-mentioned configuration in the wavelength transmission characteristic of the light transmission filter, it can also execute the same function as the earlier-mentioned ones, thus extracting signal light with a desired wavelength. Furthermore, when the control signal generating unit determines to which the signal light with a desired wavelength belongs, to the first, second or third set band, signal light with a desired wavelength can be extracted even if a WDM signal obtained by multiplexing a plurality of signal light with a wider wavelength band is inputted.

In the earlier-mentioned optical transmission device in the first aspect of the present invention, the light transmission filter can also include a wavelength transmission characteristic curve which has its peak in a wavelength located between the first set band and a third continuous set band that is shorter in wavelength than the first set band and that linearly drops from the peak toward the bottom in a wavelength located between the first and second set bands and also toward the shorter wavelength side than the third set band.

Although this configuration differs from the earlier-mentioned configuration in the wavelength transmission characteristic of the light transmission filter, it can also execute the same function as the earlier-mentioned ones, thus extracting signal light with a desired wavelength. Furthermore, when the control signal generating unit determines to which the signal light with a desired wavelength belongs, to the first, second or third set band, signal light with a desired wavelength can be extracted even if a WDM signal obtained by multiplexing a plurality of signal light with a wider wavelength band is inputted.

This configuration can also further comprise a first optical strength detecting unit detecting the optical strength of light transmitted through the light transmission filter and a storage unit storing information indicating the wavelength transmission characteristic of the light transmission filter. In this case, the control signal generating unit generates the control signal, based on both the optical strength detected by the first optical strength detecting unit when shifting the wavelength transmission characteristic of the optical tunable filter across the entire wavelength band including all segments of multiplexed signal light and the information stored in the storage unit.

According to this configuration, the control signal generating unit can obtain the strength of signal light with a desired wavelength that has been transmitted through both the optical tunable filter and the light transmission filter from the first strength detecting unit and also can obtain the wavelength transmission characteristic of the light transmission filter from the information stored in the storage unit. Therefore, by doing as described above, a control signal needed to extract the signal light with a desired wavelength can be determined, and then, the signal light can be extracted by applying this control signal to the optical tunable filter.

Furthermore, this configuration can also further comprise a second optical strength detecting unit detecting the strength of light transmitted through the optical tunable filter. In this case, the control signal generating unit generates the control signal, based on both the respective optical strength detected by the first and second optical strength detecting units when shifting the wavelength transmission characteristic of the optical tunable filter across the entire wavelength band including all segments of multiplexed signal light and the information stored in the storage unit.

According to this configuration, a control signal needed to extract signal light with a desired wavelength can be properly determined by comparing the normalized optical strength detected by the first and second optical strength detecting units, which is normalized by the optical strength detected by the second optical strength detecting unit, and the information stored in the storage unit even if the optical power of signal light in a WDM signal inputted to the optical tunable filter fluctuates. Therefore, by applying this control signal to the optical tunable filter then, signal light with a desired wavelength can be extracted.

The optical transmission device in the fifth aspect of the present invention comprises: an optical tunable filter which transmits and extracts signal light with a specific wavelength from signal light multiplexed by a wavelength division multiplexing (WDM) method and whose wavelength transmission characteristic varies depending on a control signal; a light transmission filter to which signal light extracted by the optical tunable filter and whose wavelength transmission characteristic curve monotonously changes in a range between the first continuous set band and the second continuous set band longer in wavelength than the first set band; and a control signal generating unit generating a control signal needed to enable the optical tunable filter to extract signal light with a desired wavelength, based on the light transmitted the light transmission filter.

In this configuration, the monotonous change of the transmission characteristic of the light transmission filter covers at least 60 nm or more.

Since in the above-mentioned configuration, the wavelength transmission characteristic of the light transmission filter is already known, the optical strength of signal light with a desired wavelength properly extracted by the optical tunable filter that is detected after being transmitted through the light transmission filter is known in advance. Therefore, the wavelength characteristic of the optical tunable filter can be shifted by changing a control signal generated by the control signal generating unit. If the strength of signal light after being transmitted through the light transmission filter becomes a predetermined value in the course of shifting this wavelength transmission characteristic, a control signal then is a control signal needed to extract signal light with a desired wavelength. Then, by applying this control signal to the optical tunable filter, signal light with a desired wavelength can be extracted.

The optical transmission device in the sixth aspect of the present invention comprises: an optical tunable filter which transmits and extracts signal light with a specific wavelength from signal light that is multiplexed by a wavelength-division multiplexing (WDM) method, using a first continuous set band, a second set band longer in wavelength than the first continuous set band, and a third continuous set band shorter in wavelength than the first set band, and whose wavelength transmission characteristic varies depending on a control signal; a detection unit detecting signal light extracted by the optical tunable filter; a reference signal light detecting unit detecting two segments of reference signal light from the signal light detected by the detection unit, which are always contained in signal light inputted to the optical tunable filter, and one of which is a wavelength located between the first and second set bands and the other of which is a wavelength located between the first and third set bands; and a control signal generating unit generating the control signal, based on both the detected wavelength of reference signal light, which is known to be located between the first and second set bands, of all wavelengths detected by the reference signal light detecting unit, and the wavelength of the signal light detected by the reference signal light detection unit if the wavelength of the signal light extracted by the optical tunable filter is included in the second set band, and generating the control signal, based on both the wavelength detected by the reference signal light, which is known to be located between the first and third set bands, of all wavelengths detected by the reference signal light detecting unit, and the wavelength of the signal light detected by the detection unit if the wavelength of the signal light extracted by the optical tunable filter is included in the third set band.

According to this configuration, even if signal light with a desired wavelength belongs to any of the first, second and third set band, a control signal needed to extract the signal light with a desired wavelength is determined based on the reference signal light adjacent to the wavelength band to which it belongs. Therefore, the determination accuracy of this control signal can be secured and the wrong extraction of a signal with a wavelength different from a desired one can be prevented.

In this configuration, if an instruction to extract signal light is not received yet, the control signal generating unit can also performs in advance a process required to select one segment of the reference signal light and to generate the control signal needed to extract the signal light and then, upon receipt of the instruction, it can also generate the control signal needed to extract the instructed signal light according to the instruction, based on the result of the process performed up to then.

Thus, time needed between receiving an instruction to extract part of signal light and generating a control signal can be reduced.

The present invention also includes the control methods of the optical tunable filter used in each aspect of the optical transmission device of the present invention, and they have the same functions/effects as obtained in each aspect of the optical transmission device.

BRIEF DESCRIPTION OF THE DRAWINGS

The present invention will be more apparent from the following detailed description when the accompanying drawings are referenced, in which:

FIG. 9 shows an example of data table stored in non-volatile memory;

FIG. 15 shows the spectrum distribution of a WDM signal after being transmitted through a wavelength stabilizing filter having the characteristic shown in FIG. 14;

DESCRIPTION OF THE PREFERRED EMBODIMENTS

The preferred embodiments of the present invention are described below with reference to the drawings.

Figure 1:
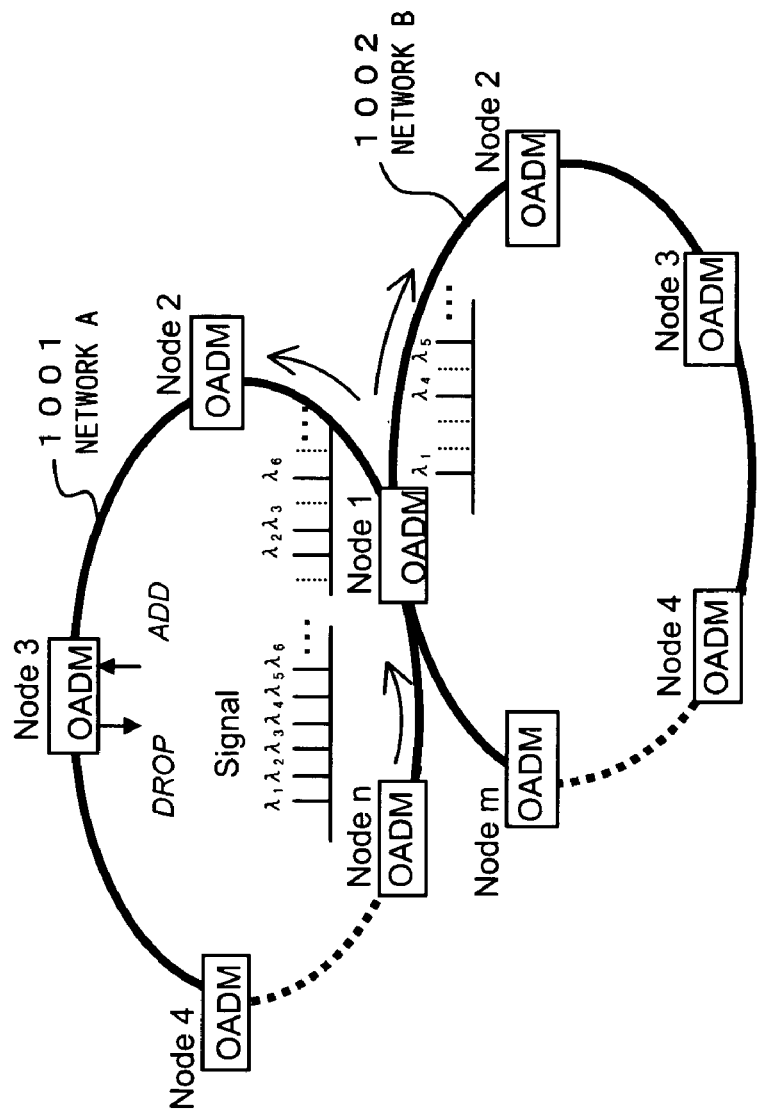
FIG. 1 shows a network configuration of an OADM.
Figure 2:
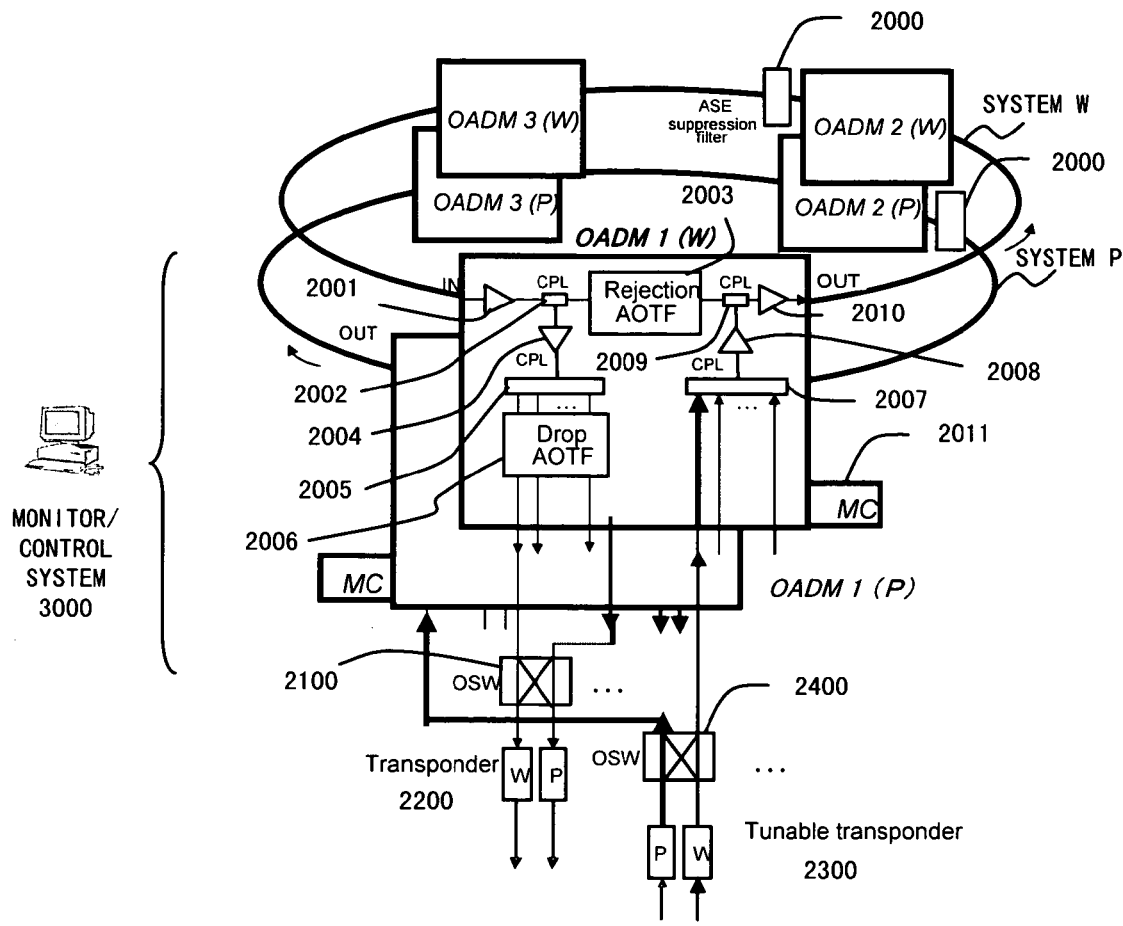
FIG. 2 shows a configuration of the OADM using an AOTF.
Figure 3:
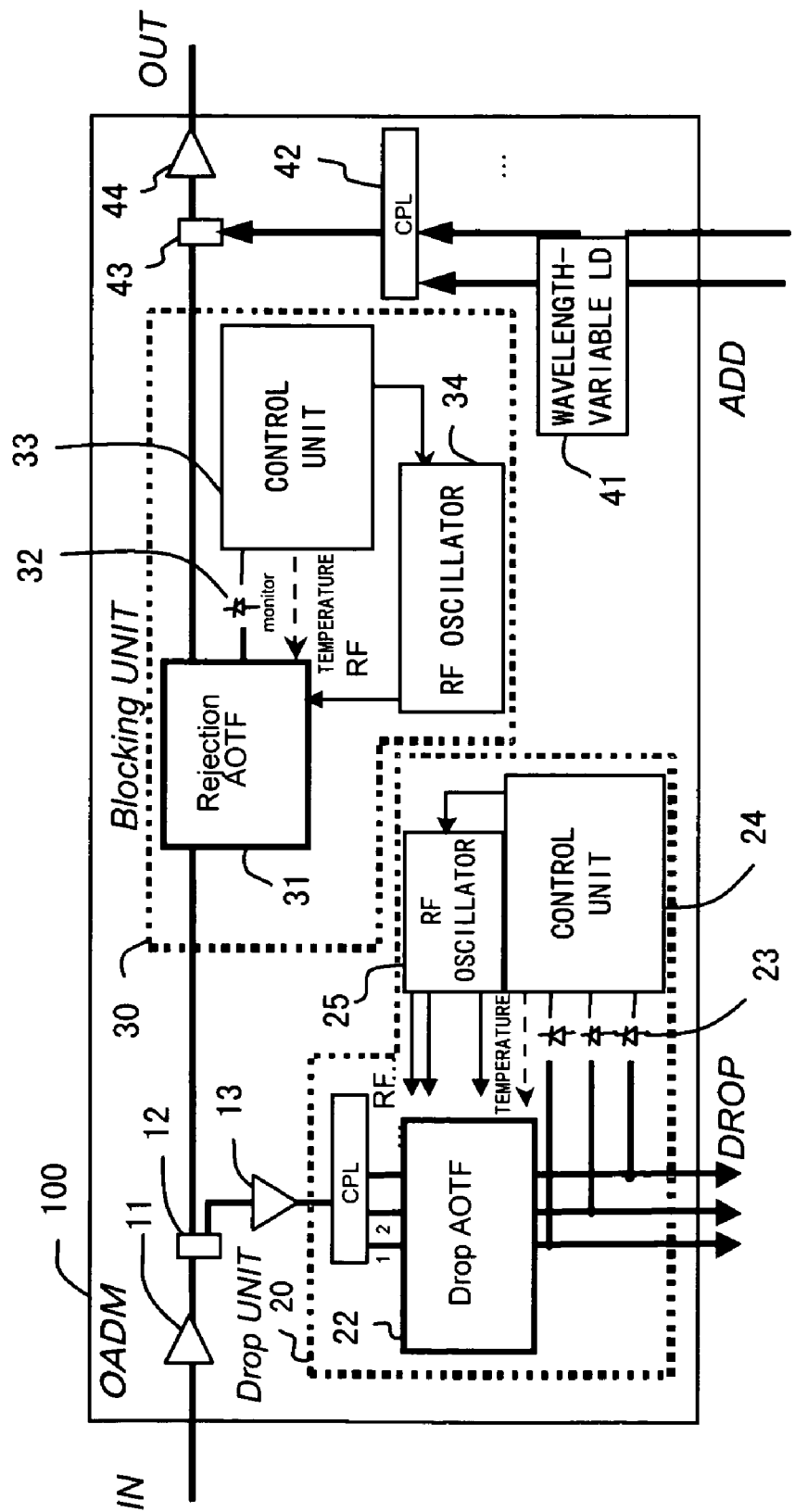
FIG. 3 shows the configuration of the OADM using an AOTF implementing the present invention.

Firstly, FIG. 3 is described. FIG. 3 shows the configuration of OADM using the AOTF of the present invention, which is the detailed configuration of the OADM shown in FIG. 2.

In FIG. 3, a WDM signal inputted to an OADM 100 is amplified by an amplifier 11 and then is inputted to a CPL 12. The WDM signal that is transmitted through the CPL 12 is inputted to a blocking unit 30. However, part of signal light demultiplexed by the CPL 12 is amplified by an amplifier 13 and is inputted to a drop unit 20.

The drop unit 20 has a function to extract one signal with a desired wavelength for each channel signal light from the inputted WDM signal.

The WDM signal inputted to the drop unit 20 is demultiplexed into a plurality of signals, and each of them is inputted to each drop AOTF 22. The drop AOTF 22 selects and extracts one segment of signal light with a desired wavelength from the WDM signal. Therefore, if there are a plurality of segments of signal light to drop, the same number as the plurality of segments of signal light, of drop AOTFs 22 are provided. The same number of photo-diodes 23, control units 24 and PF oscillators 25 are also provided. The extracted signal light becomes the drop output of the OADM 100.

Part of the signal light extracted by the drop AOTF 22 is demultiplexed by the CPL (not shown in FIG. 4) and is led to a photo-diode, being an optical detector, as monitor light. The photo-diode 23 converts this monitor light into an electric signal, and a signal with an electric current corresponding to the optical power of the monitor light is inputted to a control unit 24.

The control unit 24 controls the temperature of the drop AOTF 22 to be constant, and also controls the frequency of an RF signal generated by an RF oscillator 25, based on the signal obtained from the photo-diode 23.

The RF oscillator 25 oscillates an RF signal with a frequency, based on information from the control unit 24 and supplies the drop AOTF 22 with it to set the transmission characteristic of the drop AOTF 22 so as to transmit the sufficient amount of the channel signal light with a desired wavelength.

On the other hands, the blocking unit 30 to which the WDM signal that has been transmitted through the CPL 12 is inputted has a function to suppress and output the channel signal light with a desired wavelength that is extracted from the WDM signal, which is usually extracted by the drop unit 20.

The WDM signal inputted to the blocking unit 30 is then inputted to a rejection AOTF 31, and suppresses the channel signal light with a desired wavelength extracted from the WDM signal and outputs it to a CPL 43. This one rejection AOTF 31 has a function to suppress a plurality of segments of signal light each with a different wavelength extracted from the WDM light.

The signal light suppressed by the rejection AOTF 31 is led to a photo-diode 32, being an optical detector, as monitor light. The photo-diode 32 converts this monitor light into an electric signal, and the electric signal with a current corresponding to the optical power of the monitor light is inputted to a control unit 33.

The control unit 33 controls so that the temperature of the rejection AOTF 31 is constant, and also controls the frequency of an RF signal generated by the RF oscillator 34, based on the signal obtained from the photo-diode 32.

The RF oscillator 34 generates an RF signal with a frequency based on information from the control unit 33 and supplies the rejection AOTF 31 with it to set the suppression characteristic of the rejection AOTF 31 so that the channel signal light with a desired wavelength can be sufficiently suppressed.

In the meantime, a signal to be transmitted to a network (ADD signal) is inputted to the wavelength-variable LD (laser diode) 41 of the OADM 100. Then, the signal is converted into signal light with a predetermined wavelength. The signal light is multiplexed with a plurality of segments of other signal light each with a different wavelength by a CPL 42. The signal light multiplexed by the CPL 42 is inputted to a CPL 43 and is multiplexed with the signal light transmitted without being suppressed by the blocking unit 30, of the WDM signal inputted to the OADM 100. The WDM signal multiplexed by the CPL 43 is amplified up to a predetermined size by an amplifier 44 and then is transmitted from the OADM 100.

The OADM 100 shown in FIG. 3 is configured as described above.

Next, a method for controlling the tunable filter of the present invention is described. The control method of the drop AOTF 22 selecting one signal with a desired wavelength under the control of the control unit 24 provided for the drop unit 20 of the OADM 100 shown in FIG. 3, is described.

The First Preferred Embodiment

Figure 4:
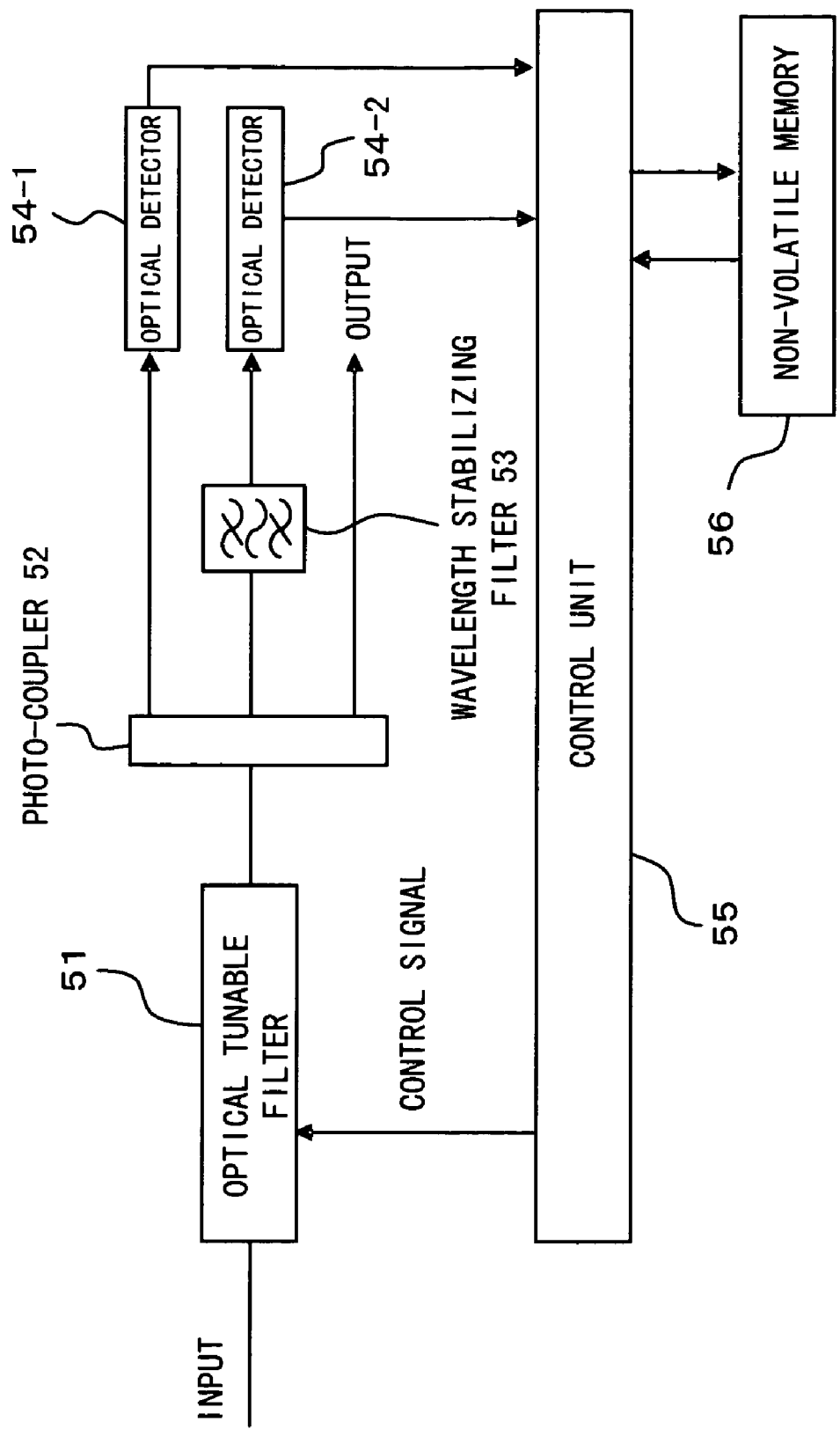
FIG. 4 shows a first configuration of an optical tunable filter control circuit implementing the present invention.

Firstly, FIG. 4 is described. FIG. 4 shows the first configuration of the optical tunable filter control circuit of the present invention. This optical tunable filter control circuit is provided for the drop unit 20 of the OADM 100 shown in FIG. 3.

In FIG. 4, an optical tunable filter 51 is a wavelength-variable filter, which selects and extracts one signal with a desired wavelength for each channel signal light from a WDM signal inputted to it. The selection of signal light to be extracted is conducted by a control signal applied by a control unit 55. The wavelength transmission characteristic of the optical tunable filter 51 is shifted by this control signal. In the OADM 100 shown in FIG. 3, the drop AOTF 22 corresponds to this filter 51.

In the following description, a control signal to be applied to the optical tunable filter 51 is an RF signal, and by changing the frequency of this RF signal, the wavelength of signal light that can be transmitted through the optical tunable filter 51 can be changed.

A photo-coupler 52 demultiplexes signal light extracted by the optical tunable filter 51 and outputs part of the signal light as monitor light.

A wavelength stabilizing filter 53 is a light transmission filter to which the monitor light outputted from the photo-coupler 52. The wavelength transmission characteristic of this wavelength stabilizing filter 53 is described later.

Optical detectors 54-1 and 54-2 detect the optical power of the monitor light directly outputted from each photo-coupler 52 or transmitted through and outputted from the wavelength stabilizing filter 53, and output information corresponding to the strength of the signal light extracted by the optical tunable filter 51, which correspond to the photo-diode 23 in the OADM shown in FIG. 3.

The control unit 55 comprises a CPU (central processing unit), memory storing in advance a control program for enabling this CPU to execute a variety of control processes including a selection process described later and a control signal generating circuit generating a control signal to be applied to the optical tunable filter 51 according to an instruction from the CPU. In the OADM 100 shown in FIG. 3, the control unit 24 and RF oscillator 25 correspond to this control unit 55.

Non-volatile memory 56 stores data on the wavelength transmission characteristic of the wavelength stabilizing filter 53, which is read by the CPU of the control unit 55. The details of this data are described later.

A method for appropriately selecting one signal with an arbitrary wavelength from a WDM signal is described below with reference to the configuration of the optical tunable filter control circuit shown in FIG. 4.

Figure 5:
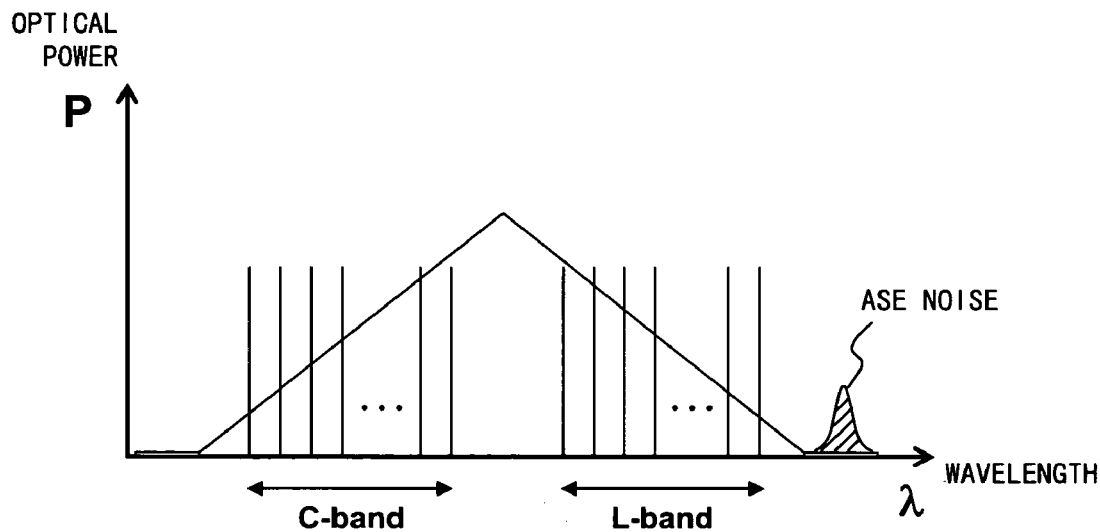
FIG. 5 shows a first example of the wavelength transmission characteristic of a wavelength stabilizing filter.

Firstly, FIG. 5 is described. FIG. 5 shows a first example of the wavelength transmission characteristic of the wavelength stabilizer filter 53 shown in FIG. 4.

A wavelength meter for WDM signal and a wavelength locker for WDM signal which are distributed in the market have an input/output characteristic that could be obtained as if the wavelength stabilizing filter 53 shown in FIG. 4 were combined with the optical detector 54-2 shown in FIG. 4. They outputs voltage according to the wavelength of input signal light. Such products include one having a characteristic that the output voltage against the change in wavelength of input signal light changes linearly. However, such a product can satisfy this linear functional characteristic only in the narrow band of the wavelength of input light, such as only in a C band or only in an L band.

Therefore, as shown in FIG. 5, the wavelength stabilizing filter 53 has a convex wavelength transmission characteristic curve that has its peak in a wavelength between a C band and an L band and that linearly drops from the peak toward the shorter wavelength side than the C band and also toward the longer wavelength side than the L band.

Such a characteristic can also be easily obtained by combining an above-mentioned product for C band with one for L band.

It is preferable for the slope of the wavelength transmission characteristic curve possesses by this wavelength stabilizing filter 53 to be linear within each of the C and L bands. However, it is passable even if the slope is not strictly linear as long as the relationship between a wavelength and an optical power is maintained monotonous. Therefore, for a filter needed to obtain this characteristic, for example, an etalon filter or a dielectric multi-layer filter can be used.

Since the wavelength bands of C and L bands are approximately 1,525 nm through 1,565 nm, and 1,570 nm through 1,610 nm, respectively, it is preferable for the peak of the wavelength transmission characteristic curve shown in FIG. 5 to be located between them, which is between 1,565 nm and 1,570 nm.

Figure 6:
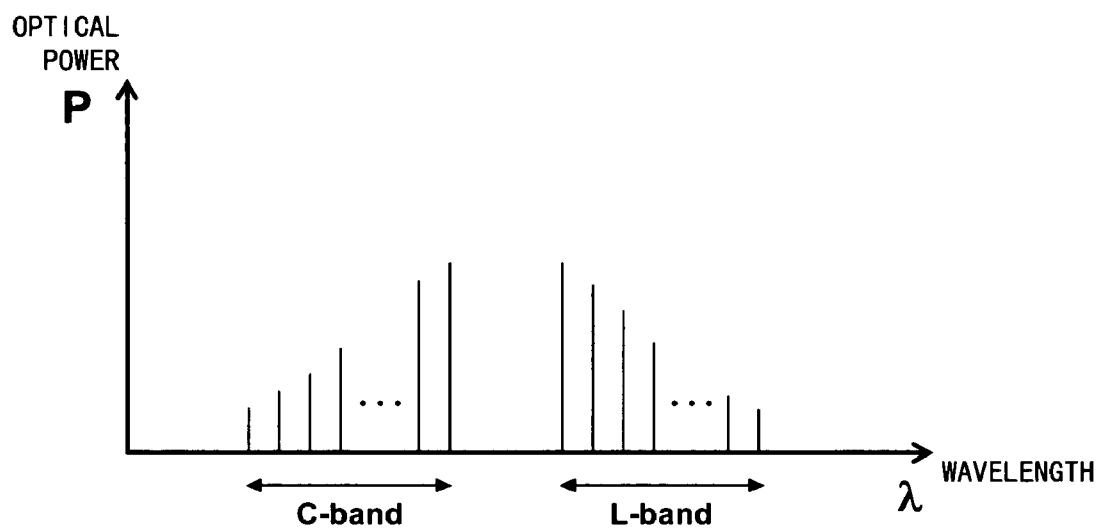
FIG. 6 shows the spectrum distribution of a WDM signal after being transmitted through a wavelength stabilizing filter having the characteristic shown in FIG. 5.

FIG. 6 shows the optical spectrum obtained after a WDM signal containing each channel signal light in each of the C and L bands being inputted to and transmitted through the wavelength stabilizing filter 53 having the wavelength transmission characteristic shown in FIG. 5. As seen from FIG. 6, in this optical spectrum, the optical power of each transmitted channel signal light gradually increases from the short wavelength side (around 1,525 nm) toward the long wavelength side (around 1,575 nm) in the C band, and it decreases from the short wavelength side (around 1,570 nm) toward the long wavelength side (around 1,610 nm) in the L band. By using such a filter, twice the wavelength detection accuracy of a filter in which the entire band from the C band to the L band is covered by a linear slope can be realized.

As shown in FIG. 5, the wavelength stabilizing filter 53 can also have a characteristic of blocking signal light with a wavelength located on the shorter wavelength side than the C band and one with a wavelength located on the longer wavelength side than the L band. By doing so, the wavelength stabilizing filter 53 can block ASE (amplified spontaneous emission) noise, being natural optical noise, which is generated and accumulated by each amplifier existing a ring-structured network. Therefore, a wrong operation such that the optical tunable filter 51 wrongly selects the ASE noise as a WDM signal when enabling the control unit 55 to perform a control process described later to enable the optical tunable filter 51 to select one signal with an arbitrary wavelength from the WDM signal, can be prevented.

Next, the control process of the control unit 55 shown in FIG. 4 is described in detail.

Figure 7:
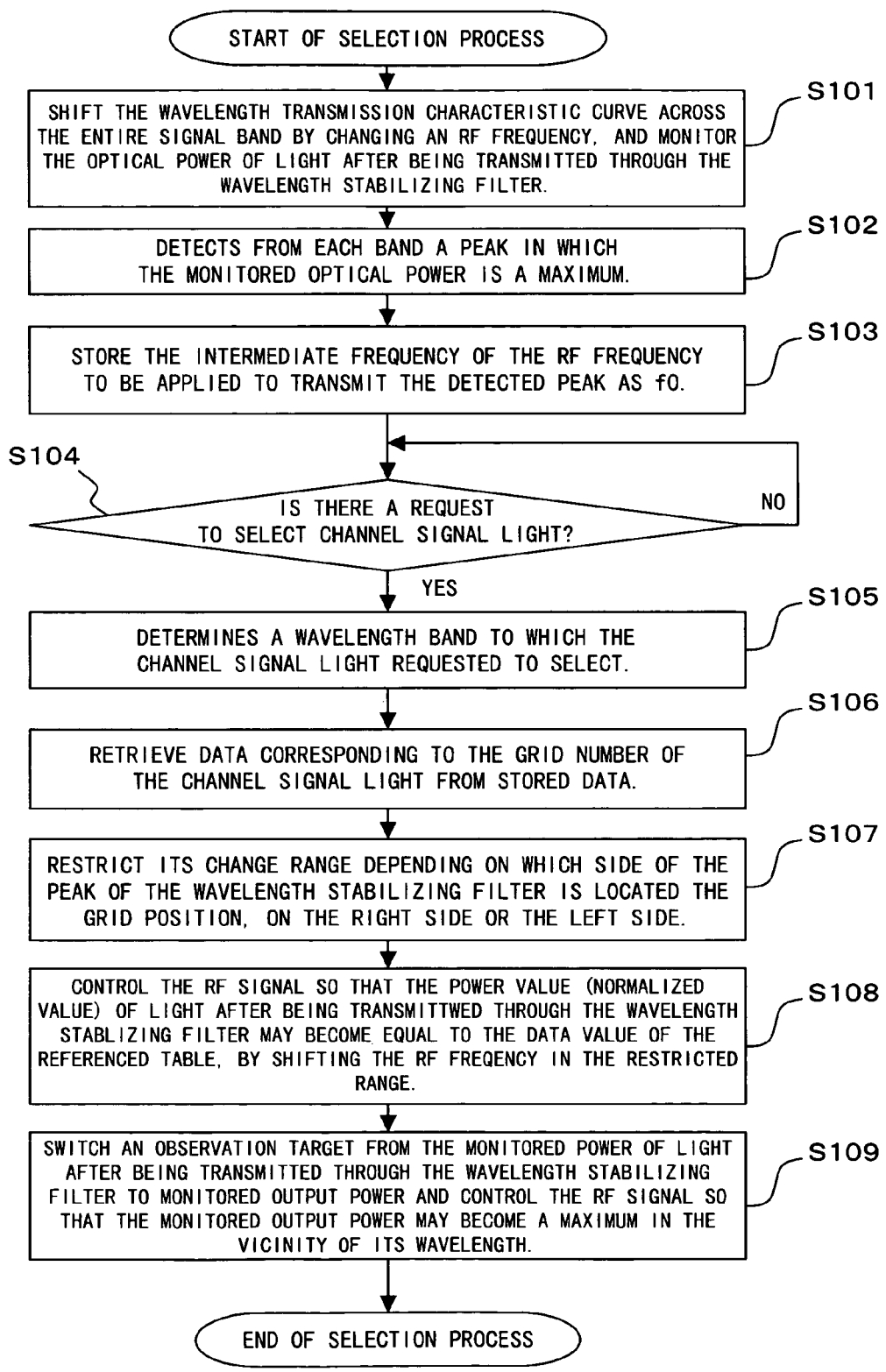
FIG. 7 is a flowchart showing the process contents of the first example of a selection process.

FIG. 7 is a flowchart showing a first example of a selection process that the control unit 55 performs against in order to enable the optical tunable filter 51 to select channel signal light with a desired wavelength from a WDM signal. This selection process can be realized by enabling the CPU of the control unit 55 shown in FIG. 4 to execute the earlier-mentioned control program.

This process shown in FIG. 7 is started when the optical tunable filter control circuit shown in FIG. 4 is switched on or when this optical tunable filter control circuit is put in a so-called waiting state where the selection of specific channel signal light is not instructed.

Firstly, in step S101 of FIG. 7, the wavelength transmission characteristic of the optical tunable filter 51 is shifted across the entire target wavelength band from which signal light is selected by continuously changing the frequency of an RF signal to be applied to the optical tunable filter 51, in this case, across the entire band including C and L bands. Then, the optical power value of monitor light transmitted through the wavelength stabilizing filter 53, which is detected by the optical detector 54-2 when shifting the wavelength transmission characteristic, is obtained.

Figure 8:
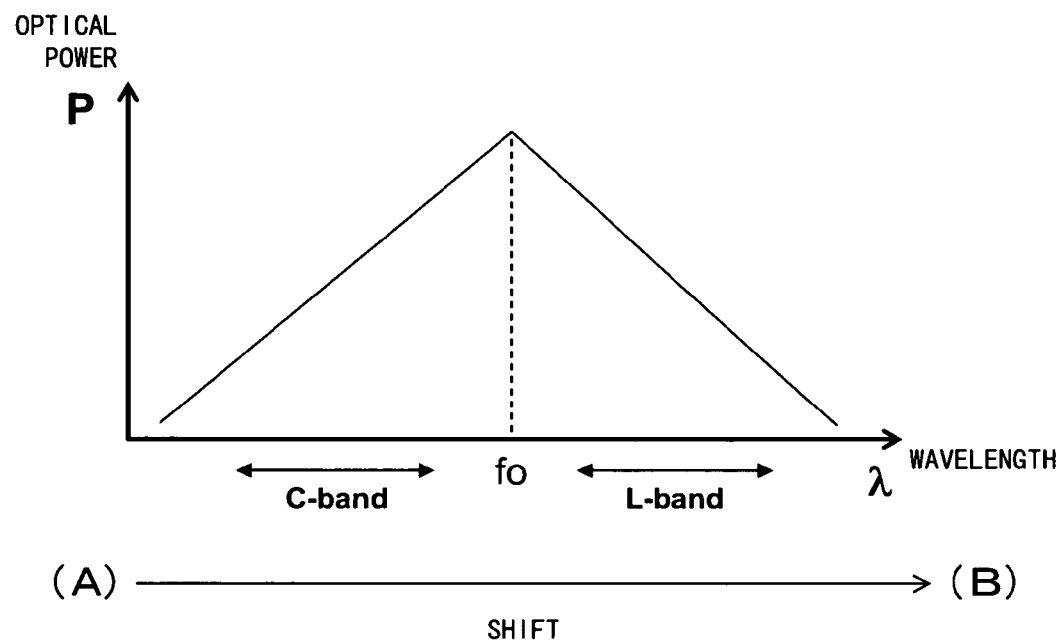
FIG. 8 shows shifting the wavelength transmission characteristic of the optical tunable filter.

In this case, the frequency of the RF signal is changed so that the wavelength transmission characteristic of the optical tunable filter 51 may shifted from the shorter wavelength side than the C band which is out of the wavelength band of a WDM signal inputted to the optical tunable filter 51 toward the longer wavelength side than the L band which is also out of the wavelength band, as shown by the arrow mark directed from (A) toward (B) in FIG. 8.

From the optical power value of the monitor light detected in step S101, the optical spectrum distribution shown in FIG. 6 is obtained.

In step S102, peaks, whose optical power is a maximum in each of the C and L bands are detected from the spectrum distribution.

In step S103, the frequency of the RF signal applied to the optical tunable filter 51 when signal light corresponding to the peak of the spectrum distribution in each wavelength band, that is detected in step S102 is obtained, based on the relationship, that is obtained in step S101, between the frequency of the RF signal to be applied to the optical tunable filter 51 and the optical power value of the monitor light transmitted through the wavelength stabilizing filter 53. Then, an intermediate frequency between the respective frequencies of the RF signals corresponding to the peaks of the spectrum distribution in each wavelength band (frequency obtained by arithmetic averaging the two frequencies) is computed and is designated as f0.

As shown in FIG. 8, frequency f0 computed thus becomes the frequency of an RF signal to be applied to enable the optical tunable filter 51 to transmit the signal light with the intermediate wavelength between the frequencies of the RF signals in the C and L bands corresponding to the peaks of the wavelength transmission characteristic curve of the wavelength stabilizing filter 53.

In step S104, it is determined whether a request to select channel signal light with a specific wavelength is received, and this determination is repeated until this request is received. When the above-mentioned request is received, the process proceeds to step S105.

In step S105, it is determined whether a band to which channel signal light to be requested to select belongs is C or L band.

In step S106, data stored in the non-volatile memory 56 is referenced.

Here, FIG. 9 is described. FIG. 9 shows an example of the data stored in the non-volatile memory 56.

In the example, values standardized by ITU (International Telecommunication Union) are stored in the fields of a grid number being a number used to identify channel signal light, an ITU grid frequency indicating the frequency of signal light with the grid number and an ITU grid wavelength indicating the wavelength of the signal light with the grid number.

A wavelength stabilizing filter power monitor value indicates the optical power of signal light outputted from the wavelength stabilizing filter 53 when signal light with a wavelength indicated by an ITU grid wavelength is inputted to the wavelength stabilizing filter 53. This value is expressed by a normalized value obtained by dividing the optical power value of the signal light outputted from the wavelength stabilizing filter 53 by the optical power value of the signal light then inputted to the wavelength stabilizing filter 53.

In step S107, the target wavelength band of the shifting of the wavelength transmission characteristic of the optical tunable filter 51, which is conducted in a subsequent step, is limited to a band determined in step S105.

In step S108, the wavelength transmission characteristic of the optical tunable filter 51 is shifted within the wavelength band limited in step S107 by changing the frequency of the RF signal to be applied to the optical tunable filter 51 from f0 obtained in advance. Then, by this shifting, the normalized optical power value of signal light, which is shown in the data stored in the non-volatile memory 56, outputted from the wavelength stabilizing filter 53, of channel signal light to be requested to select is matched with a normalized value obtained by dividing the optical power value of monitor light after being transmitted through the wavelength stabilizing filter 53, that is obtained by the optical detector 54-2 by the optical power value of the monitor light before being transmitted through the wavelength stabilizing filter 53, that is obtained by the optical detector 54-1.

By the process in step S108, the frequency of the RF signal to be applied to the optical tunable filter 51 is set with an error of approximately ±10 kHz against an optimal frequency needed to transmit channel signal light to be requested to select.

Then, in step S109, the frequency of the RF signal is finely adjusted so that the optical power of the monitor light that is not transmitted through the wavelength stabilizing filter 53 that is detected by the optical detector 54-1 may become a maximum. If the detected value of the optical detector 54-1 becomes a maximum by this process, the control process for enabling the optical tunable filter 51 to select signal light with a desired wavelength terminates, and after that, the application of that frequency of the RF signal is continued.

So far the first example of the selection process has been described.

Although in the above-mentioned process, the normalizing operation is performed against the optical power value of the monitor light after being transmitted through the wavelength stabilizing filter 53, this is because it is taken into consideration that the optical power of signal light in a WDM signal inputted to the optical tunable filter 51 fluctuates. If such fluctuations can be neglected, this normalizing operation can be omitted.

A variation of the above-mentioned first preferred embodiment is described below.

Figure 10:
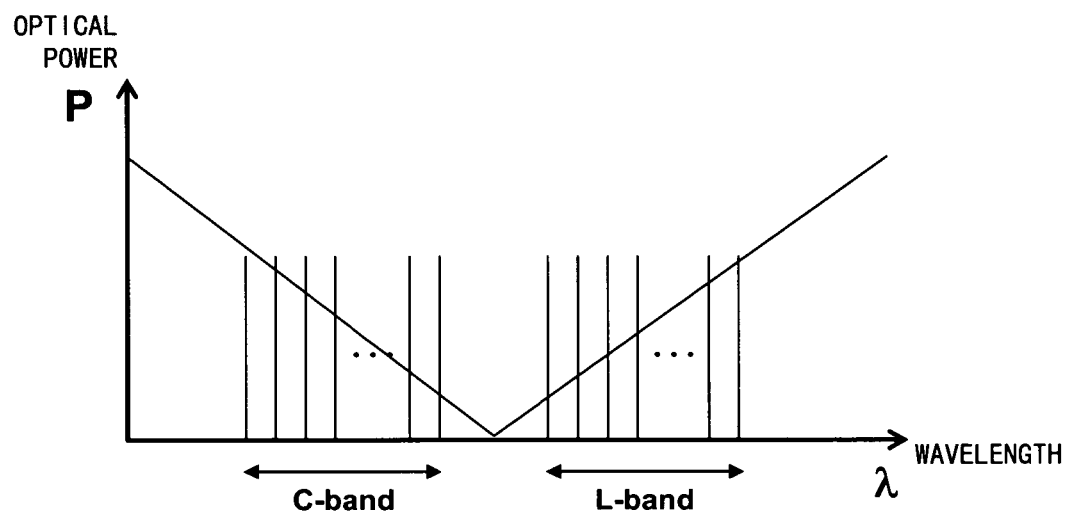
FIG. 10 shows a second example of the wavelength transmission characteristic of a wavelength stabilizing filter.

Although in the above-mentioned preferred embodiment, as shown in FIG. 5, the wavelength stabilizing filter 53 has a convex wavelength transmission characteristic curve that has its peak in a wavelength between C and L bands and that linearly drops from the peak toward the shorter wavelength side than the C band and also linearly drops from the peak toward the longer wavelength side than the L band, instead it can also have a concave characteristic shown in FIG. 10, the reverse of the wavelength transmission characteristic shown in FIG. 5, that is, that has its bottom in a wavelength between C and L bands and that linearly rises from the bottom toward the shorter wavelength side than the C band and also linearly rises from the bottom toward the longer wavelength band than the L band.

Figure 11:
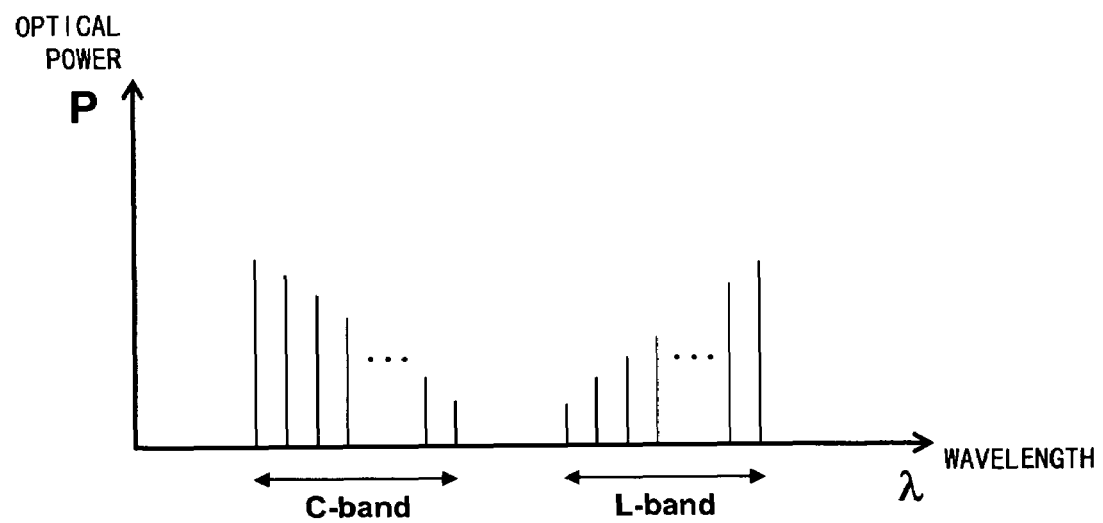
FIG. 11 shows the spectrum distribution of a WDM signal after being transmitted through a wavelength stabilizing filter having the characteristic shown in FIG. 10.

FIG. 11 shows the optical spectrum distribution of signal light transmitted through a wavelength stabilizing filter 53 that has a wavelength transmission characteristic having its bottom within the wavelength band of 1,565 nm through 1,570 nm when a WDM signal containing each channel signal light in each of the C and L bands to the wavelength stabilizing filter 53.

If the wavelength stabilizing filter 53 has such a concave wavelength transmission characteristic, in step S102 of the selection process shown in FIG. 7, the bottom of spectrum distribution, in which the optical power is a minimum in each of the C and L bands, can be detected. Then, in step S103, if an intermediate frequency between the respective frequencies of the RF signal, corresponding to the bottoms of the spectrum distribution in the wavelength bands, which are detected in step S102, is computed and is designated as f0, the optical tunable filter 51 can select signal light with a desired wavelength.

A filter used as the wavelength stabilizing filter 53 includes one that can also output reflected light having a characteristic (transmission characteristic) the reverse of a characteristic (transmission characteristic) given to light transmitted through a filter. If such a filter is used, the setting accuracy of the frequency of an RF signal to be applied to enable the optical tunable filter 51 to select channel signal light with a desired wavelength can be further improved. This method is described below.

Figure 12:
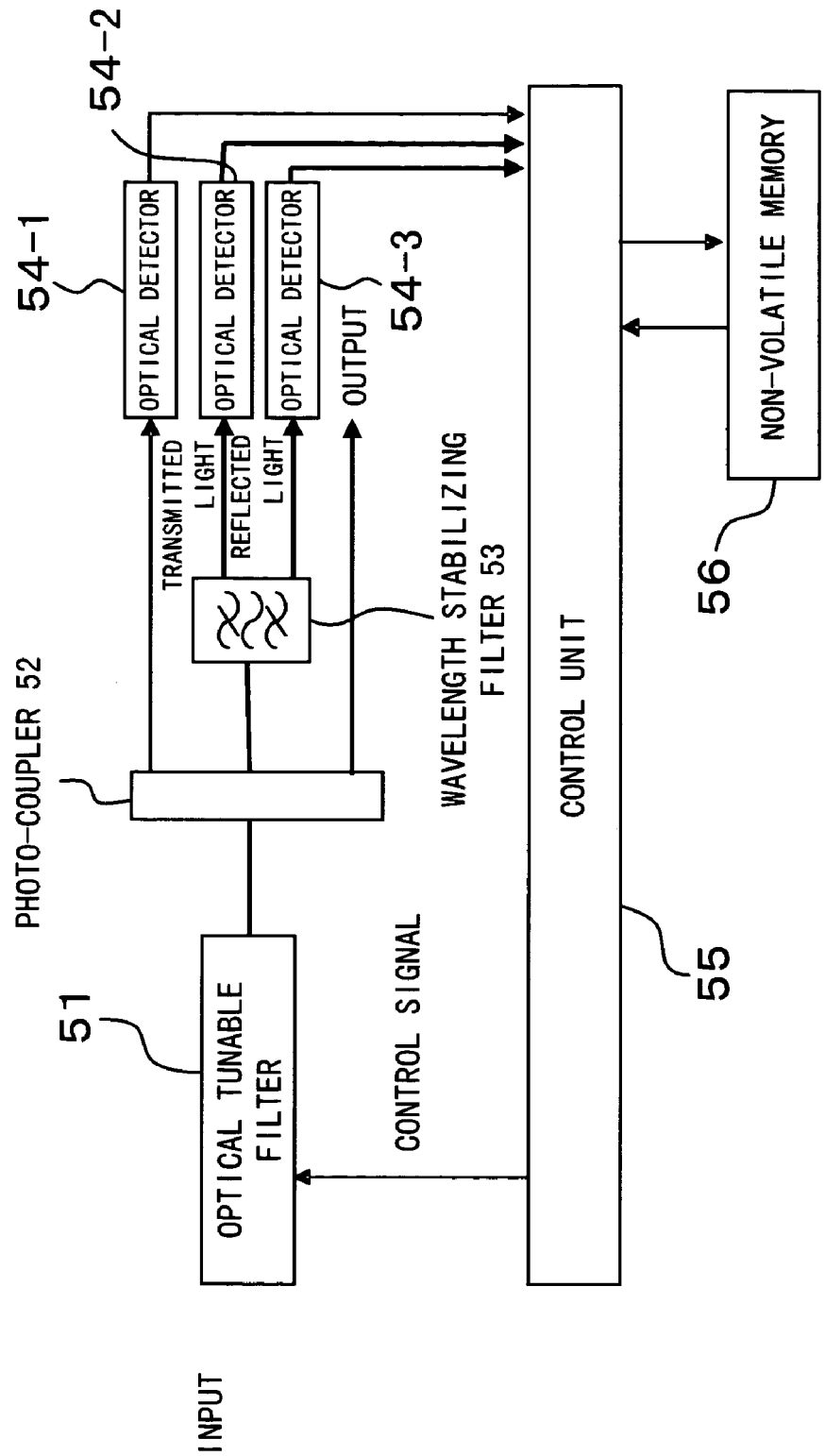
FIG. 12 shows a second configuration of an optical tunable filter control circuit implementing the present invention.

Firstly, FIG. 12 is described. FIG. 12 shows a second configuration of the optical tunable filter implementing the present invention. This optical tunable filter control circuit is provided for the drop unit 20 of the OADM 100 shown in FIG. 3.

The configuration shown in FIG. 12 differs from the first configuration shown in FIG. 4 in that the wavelength stabilizing filter 53 to which monitor light outputted from a photo-coupler 52 can output the above-mentioned reflected light and that an optical detector 54-3 is provided to detect the optical power value of this reflected light and to notify the control unit 55 of it.

In the configuration shown in FIG. 12, the control unit 55 computes the differential value of the optical power according to the following equation:

(Differential value of optical power)=(Optical power value of transmitted light)−(Optical power value of reflected light)

If as to the optical power values of transmitted light and reflected light that are used compute this differential value, the fluctuation of the optical power of signal light in a WDM signal inputted to the optical tunable filter 51 is taken into consideration, it is preferable to use normalized values for them, as in the earlier-mentioned case.

Figure 13:
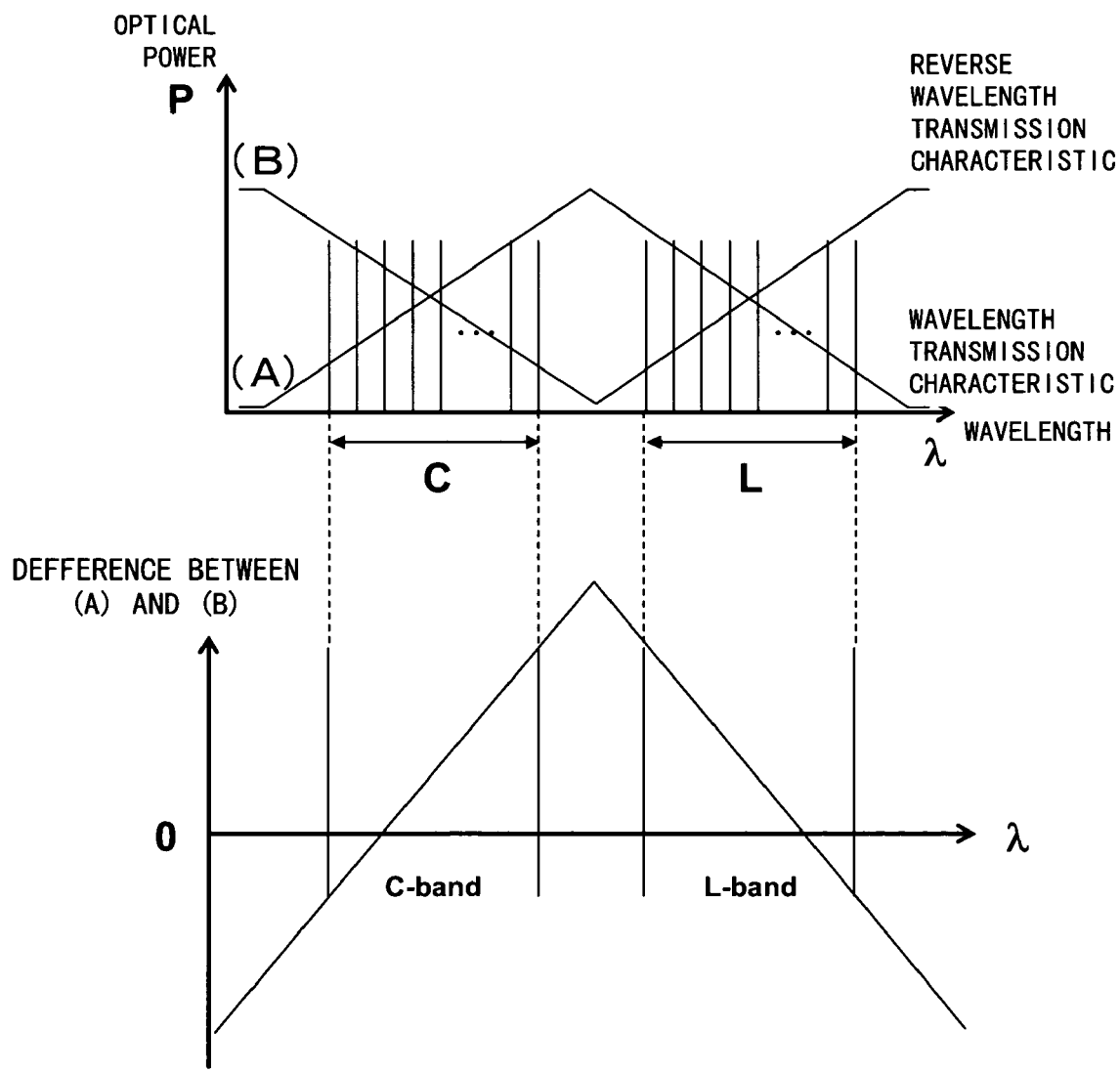
FIG. 13 shows the characteristic of the difference between the transmission characteristic and reverse transmission characteristic of the wavelength stabilizing filter.

The difference of the optical power computed thus has the characteristic shown in FIG. 13 against the wavelength of signal light inputted to the wavelength stabilizing filter 53. As also seen from FIG. 13, twice the change range of the optical power value of only transmitted light or reflected light can be obtained in the difference between the optical power value of transmitted light and that of reflected light. Therefore, if a point in which the optical power becomes a maximum or a minimum is detected from the optical spectrum distribution of a WDM signal, using this difference, the detection accuracy can be improved. As a result, the setting accuracy of the frequency of an RF signal to be applied to enable the optical tunable filter 51 to select signal light with a desired wavelength can be improved.

If the optical power value of signal light outputted from the wavelength stabilizing filter 53, which is stored in non-volatile memory 56 in accordance with the earlier-mentioned grid number is designated as the normalized value of the differential value computed as described above and in step S108 of the selection process of the control unit 55, shown in FIG. 7, the differential value stored in the non-volatile memory 56 is matched with the differential value of the optical power, obtained according to the earlier-mentioned equation by shifting the wavelength transmission characteristic of the optical tunable filter 51, the optical tunable filter can select channel signal light with a desired wavelength using this difference of optical power.

Figure 14:
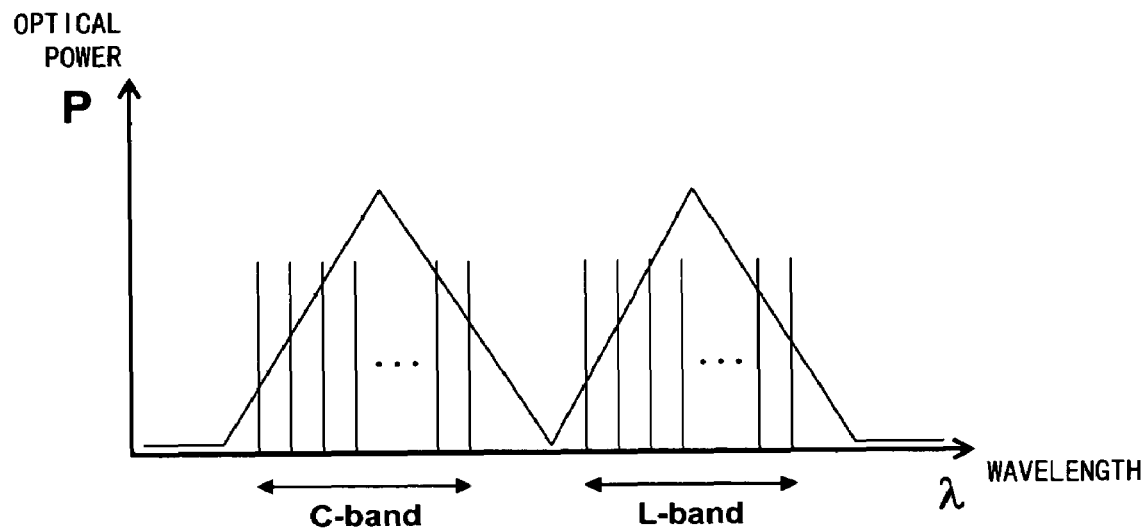
FIG. 14 shows a third example of the wavelength transmission characteristic of a wavelength stabilizing filter.

Even if the wavelength stabilizing filter 53 having the configuration shown in FIG. 4 has the wavelength transmission characteristic shown in FIG. 14, the optical tunable filter 51 can select the signal light with a desired wavelength. The wavelength transmission characteristic curve shown in FIG. 14 has its respective peaks in the center wavelengths of the C and L bands and that linearly drops from each of the peaks toward a wavelength located between the C and L bands, linearly drops from the peak in the center wavelength of the C band toward the short wavelength side, and linearly drops from the peak in the center wavelength of the L band toward the long wavelength side.

FIG. 15 shows the optical spectrum distribution of signal light after being transmitted through the wavelength stabilizing filter 53 having such a wavelength transmission characteristic when a WDM signal containing each channel signal light in each of the C and L bands is inputted to the wavelength stabilizing filter 53.

When the wavelength stabilizing filter 53 has such a wavelength transmission characteristic, the optical tunable filter 51 can select signal light with a desired wavelength if in step S105 of the selection process shown in FIG. 7, in addition to determining which a band to which channel signal light to requested to select belongs is, a C or an L band, it is determined which a band to which the channel signal light to be requested to select is located within the C or L band, on the long wavelength side or on the short wavelength side, and in step S107, the changing target wavelength band of the wavelength transmission characteristic of the optical tunable filter 51 in step S108 is limited to the band determined in step S105. In this case, which a band to which the channel signal light to be requested to select is located within the C or L band, on the long wavelength side or on the short wavelength side, can be determined by determining which the wavelength of the channel signal light to be requested to select is located, on the long wavelength side or on the short wavelength side, within the band to which the channel signal light belongs, using spectrum distribution in which its optical power is a maximum in each of the C and L bands detected in step S102 as a reference.

In this case, the difference in optical power value of monitor light detected against the difference in wavelength of the monitor light is expanded to twice of that of the wavelength stabilizing filter 53 having the wavelength transmission characteristic shown in FIGS. 5 and 10. Therefore, the setting accuracy of the frequency of an RF signal to be applied to enable the optical tunable filter 51 to select signal light with a desired wavelength can be improved so much.

Even if the wavelength stabilizing filter 53 has a wavelength transmission characteristic the reverse of that shown in FIG. 14, as in the relationship between the wavelength transmission characteristic shown in FIG. 5 and that shown in FIG. 10, that is, a wavelength transmission characteristic that has its respective bottoms in the center wavelengths of the C and L bands and that linearly rises from each of the bottoms toward a wavelength located between the C and L bands, linearly rises from the bottom in the center wavelength of the C band toward the short wavelength side and linearly rises from the bottom in the center wavelength of the L band toward the long wavelength side, the optical tunable filter 51 can select signal light with a desired wavelength by applying the same modification as that of the wavelength stabilizing filter 53 having the wavelength transmission characteristic shown in FIG. 10 or 14, to the selection process shown in FIG. 7.

In the above-mentioned preferred embodiments, signal light exists only in the C and L bands, which are currently mainly used in a WDM signal. However, even if signal light also exists in a third set band called an S band (short wavelength band: approximately 1,480 nm~1,520 nm, although there are various definitions of the actual value), which is shorter than the C band and is continuous, the optical tunable filter 51 can select the signal light with a desired wavelength by covering all the three bands with the wavelength transmission characteristic of a single wavelength stabilizing filter 53.

Figure 16:
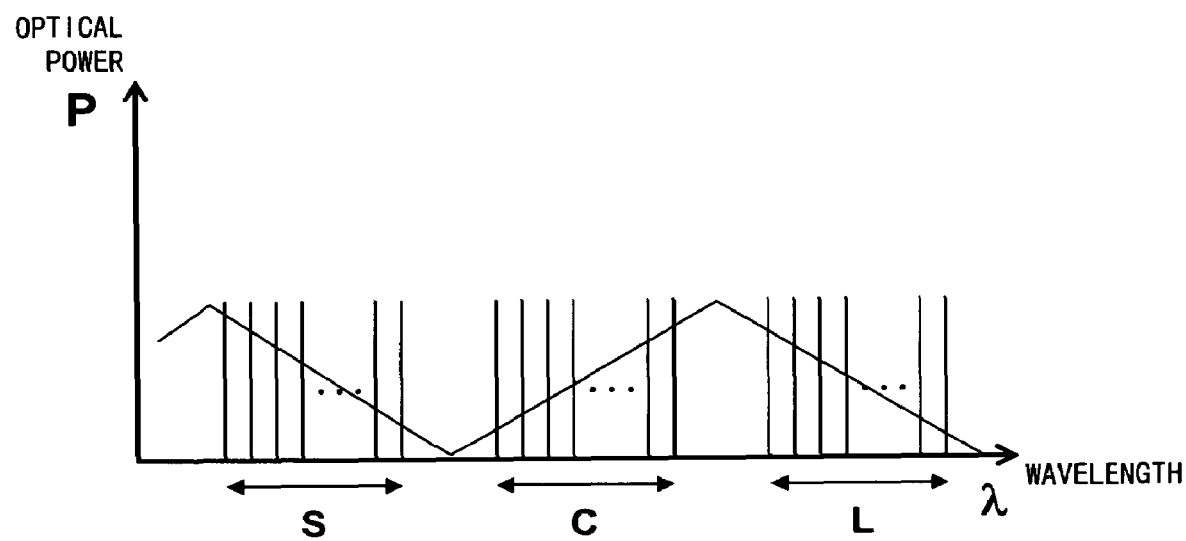
FIG. 16 shows a fourth example of the wavelength transmission characteristic of a wavelength stabilizing filter.

FIG. 16 shows an example of the wavelength transmission characteristic that covers three wavelength bands of S, C and L. The characteristic shown in FIG. 16 has in addition to the characteristic shown in FIG. 5 a wavelength transmission characteristic that has its bottom in a wavelength located between the C and S bands and that linearly rises from this bottom toward the peak in a wavelength located between the C and L bands and also toward the shorter wavelength side than the S band.

Figure 17:
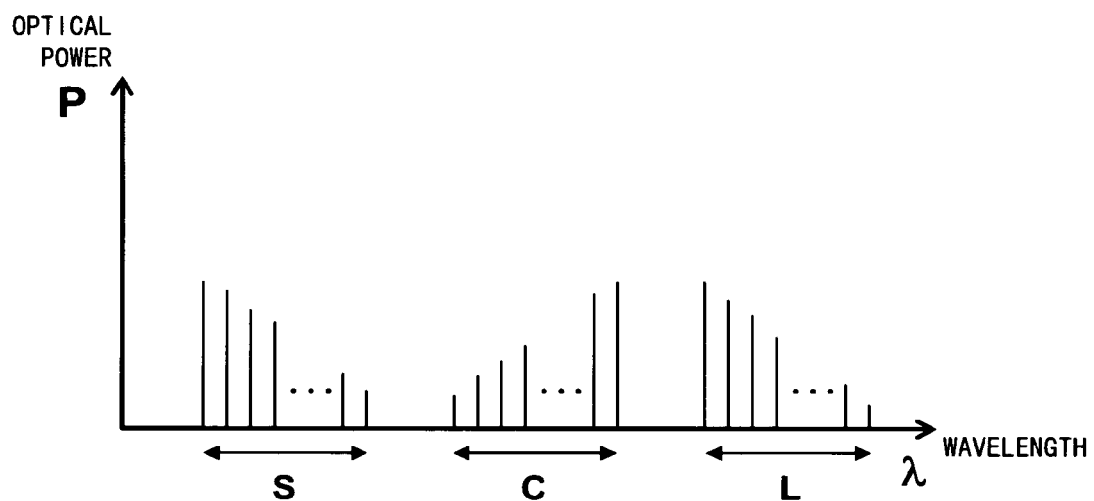
FIG. 17 shows the spectrum distribution of a WDM signal after being transmitted through a wavelength stabilizing filter having the characteristic shown in FIG. 16.

FIG. 17 shows the optical spectrum distribution of signal light after being transmitted through the wavelength stabilizing filter 53 that has a wavelength transmission characteristic curve having a bottom in the wavelength band of 1,520 nm~1,525 nm, in addition to the characteristic shown in FIG. 5 when a WDM signal containing each channel signal light in each of the S, C and L bands.

The wavelength stabilizing filter 53 in the configuration shown in FIG. 4 can have such a wavelength transmission characteristic as follows.

Firstly, data on the wavelength transmission characteristic of the wavelength stabilizing filter 53 in the S band is stored in advance in the non-volatile memory 56 in addition to that on the C and L bands.

Then, in step S102 of the selection process shown in FIG. 7, the peaks of the spectrum distribution in which the optical power is a maximum in each of the C and L bands are detected, and also its bottoms in which the optical power is a minimum in each of the C and S bands are detected. Furthermore, in step S103, the intermediate frequency between the respective frequencies of an RF signal, corresponding to the spectra in which the optical power is a maximum in each of the C and L bands, is computed and is designated as f0. Then, the intermediate frequency between the respective frequencies of an RF signal, corresponding to the spectra in which the optical power is a minimum in each of the C and S bands, is computed and is designated as f1.

Furthermore, if in step S105, it is determined which the channel signal light to be requested to select belongs to, the S, C or L band, and in step S107, the change target band of the wavelength transmission characteristic of the optical tunable filter 51 in step S108 is limited to the band determined in step S105, the optical tunable filter 51 can select signal light with a desired wavelength.

Even if the wavelength stabilizing filter 53 in the configuration shown in FIG. 4 has a wavelength transmission characteristic curve the reverse of that is shown in FIG. 16, as in the relationship between the wavelength transmission characteristic shown in FIG. 5 and that shown in FIG. 10, that is, has in addition to the characteristic shown in FIG. 10 a wavelength transmission characteristic curve that has its peak in a wavelength located between the C and S bands, and that linearly drops from the peak toward the bottom in a wavelength located between the C and L bands and also toward the shorter wavelength side than the S band, the optical tunable filter 51 can select signal light with a desired wavelength by applying the same modification as that of the wavelength stabilizing filter 53 having the wavelength transmission characteristic shown in FIG. 10 or 16 to the selection process shown in FIG. 7.

In the above-mentioned preferred embodiments, a wavelength stabilizing filter 53 having a wavelength transmission characteristic curve that has its peak within a wavelength band including signal light of a WDM signal inputted to the optical tunable filter 51. However, if instead the wavelength stabilizing filter 53 in the configuration shown in FIG. 4 has the wavelength transmission characteristic shown in FIG. 18, that is, a wavelength transmission characteristic curve that monotonously changes in the entire band of the C and L bands (at least 60 nm or more) of the WDM signal, the optical tunable filter 51 can select signal light with a desired wavelength. In this case, steps S101 through S103, S105 and S107 of the selection process shown in FIG. 7 are not needed, and in step S108, the wavelength transmission characteristic of the optical tunable filter 51 can be shifted across the entire band of the C and L bands of the WDM signal by changing the frequency of an RF signal to be applied to the optical tunable filter 51. Therefore, the process load of the control unit 55 can be reduced.

Figure 18:
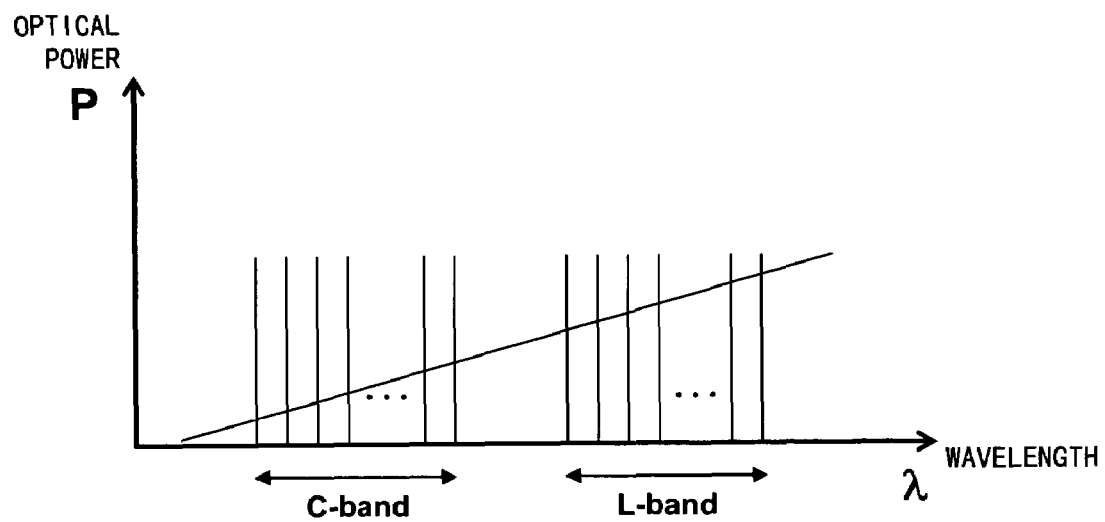
FIG. 18 shows a fifth example of the wavelength transmission characteristic of a wavelength stabilizing filter.

Although the wavelength transmission characteristic curve shown in FIG. 18 rises from the C band to the L band, the optical tunable filter 51 can also select signal light with a desired wavelength by enabling the control unit 55 to perform the above-mentioned selection process even if the wavelength stabilizing filter 53 in the configuration shown in FIG. 4 has a wavelength transmission characteristic curve the reverse of this characteristic curve, that is, a wavelength transmission characteristic curve that drops from the C band to the L band.

The Second Preferred Embodiment

Next, a second control method for enabling the optical tunable filter to select signal light with a desired wavelength is described. If the wavelength band of a WDM signal to be inputted covers the all the band of the S, C and L bands, this method select channel signal light with a desired wavelength by actually measuring the optimal frequency of the RF signal to be applied to the AOTF to transmit signal light with a predetermined wavelength within the band, computing the frequency of an RF signal needed to transmit signal light with another wavelength by interpolation using the detected result and applying the computed frequency of the RF signal to the optical tunable filter.

Figure 19:
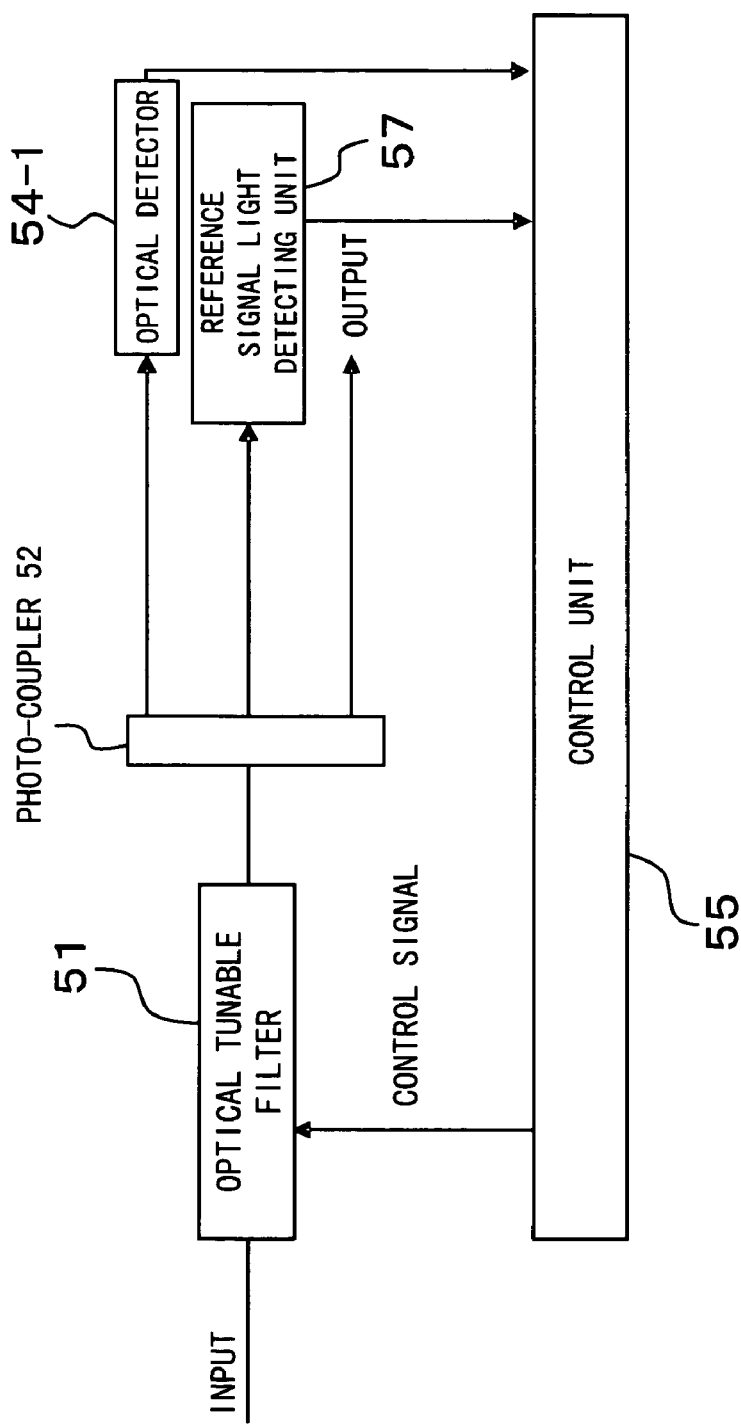
FIG. 19 shows a third configuration of an optical tunable filter control circuit implementing the present invention.

Firstly, FIG. 19 is described. FIG. 19 shows the third configuration of the optical tunable filter control circuit implementing the present invention. This optical tunable filter control circuit is provided for the drop unit 20 of the OADM 100 shown in FIG. 3.

The configuration shown in FIG. 19 is the same as that shown in FIG. 4 except for that the wavelength stabilizing filter 53 and the optical detector 54-2 to which one segment of monitor light demultiplexed and outputted by the photocoupler 52 are deleted and instead a reference signal light detecting unit is provided and that the non-volatile memory 56 connected to the control unit is omitted.

The reference signal light detecting unit 57 detects two segments of reference signal light contained in a WDM signal inputted to the optical tunable filter 51 and outputs information indicating its optical power value to the control unit 55.

Figure 20:
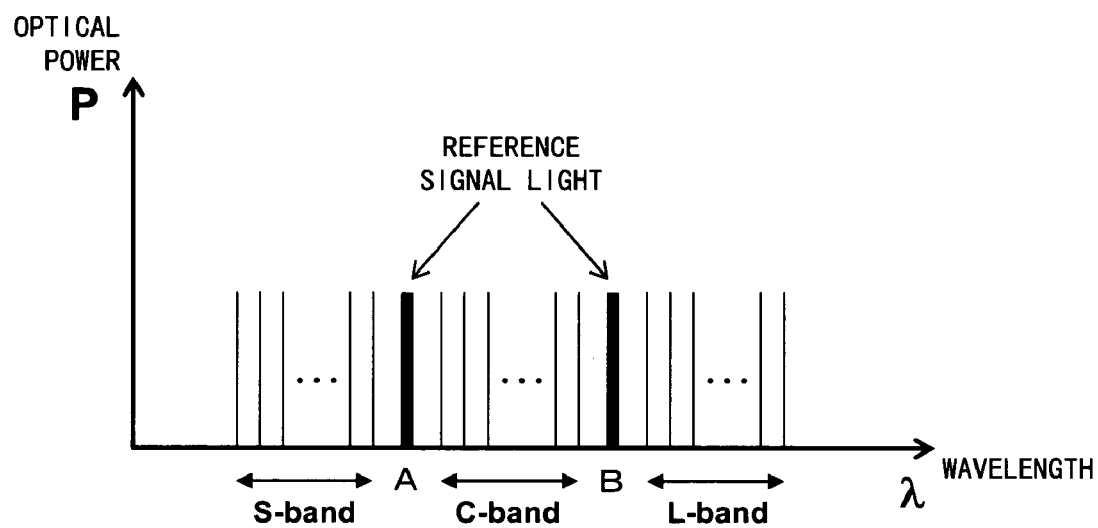
FIG. 20 shows the spectrum distribution of a WDM signal inputted to the circuit shown in FIG. 19.

Then, FIG. 20 is described. FIG. 20 shows the spectrum distribution of a WDM signal inputted to the optical tunable filter 51 shown in FIG. 19. As seen from FIG. 20, two segments of reference signal light are superimposed on this WDM signal. The wavelength of one segment of them (reference signal light A) is located between the S and C band, and that of the other (reference signal light B) is located between the C and L bands.

The reference signal light detecting unit 57 detects the optical power of each of the two segments of reference signal light. For the unit 57, any structure, such as wavelength lockers using an etalon, an FBG (fiber bragg grating), etc., and a spectrum monitor can be used, which is in advance set to detect such reference signal light with a known wavelength.

Next, the control process of the control unit 55 shown in FIG. 19 is described in detail.

Figure 21:
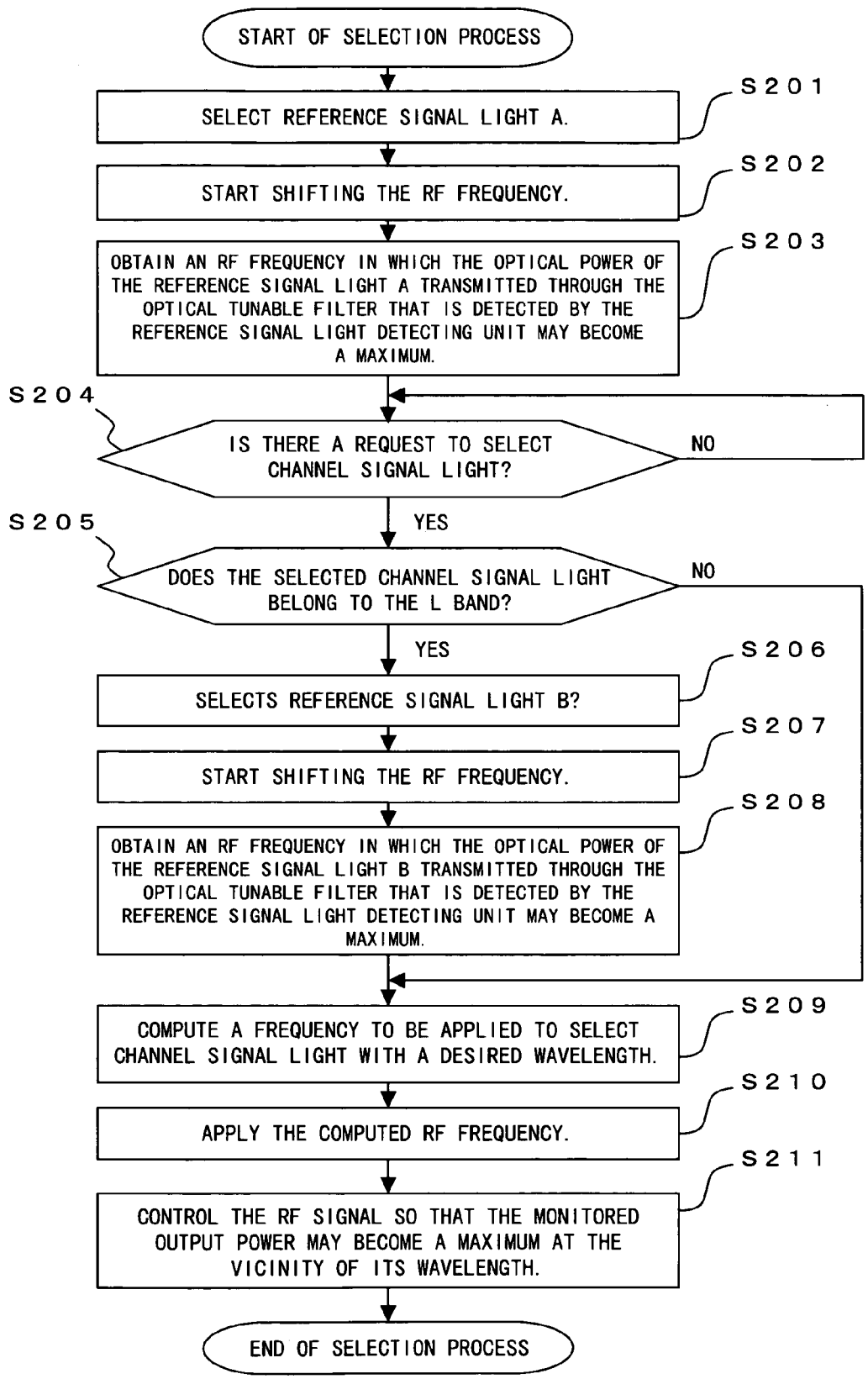
FIG. 21 is a flowchart showing the process contents of a second example of a selection process.

FIG. 21 is a flowchart showing the second example of a selection process applied to the optical tunable filter 51 by the control unit 55 to select channel signal light with a desired wavelength from a WDM signal. This selection process is realized by enabling the CPU of the control unit 55 shown in FIG. 19 to execute the earlier-mentioned control program.

This process shown in FIG. 21 is started when the optical tunable filter control circuit shown in FIG. 19 is switched on or when this optical tunable filter control circuit has not received an instruction to select channel signal light with a desired wavelength yet, is a so-called waiting state.

Firstly, in step S201, the earlier-mentioned reference signal light A contained in an inputted WDM signal is selected, and in step S202, the shifting of the wavelength transmission characteristic of an RF signal to be applied to the optical tunable filter 51 is started. Then, in step S203, when the optical power of the reference signal light A after being transmitted through the optical tunable filter 51, which is detected by the reference signal light detecting unit 57, becomes a maximum, the frequency of the RF signal applied to the optical tunable filter 51 is obtained.

In step S204, it is determined whether a request to select channel signal light with a specific wavelength is received, and the determination process is repeated until this request is received. When the above-mentioned request is received, the process proceeds to step S205.

In step S205, it is determined whether the channel signal light to be requested to select belongs to the L band. If the determination is yes, the process proceeds to step S206. If this determination in step S205 is no, that is, the channel signal light to be requested to select belongs to the C band, the process proceeds to step S209.

In step S206, the earlier-mentioned reference signal light B contained in the inputted WDM signal is selected, and in step S207, the shifting of the wavelength transmission characteristic of an RF signal to be applied to the optical tunable filter 51 is started. Then, in step S208, when the optical power of the reference signal light B after being transmitted through the optical tunable filter 51, which is detected by the reference signal light detecting unit 57, becomes a maximum, the frequency of the RF signal applied to the optical tunable filter 51 is obtained.

In step S209, the frequency of the RF signal to be applied to the optical tunable filter 51 needed to select a channel signal light with a desired wavelength which is detected to be requested in step S204 is computed.

In this computation process, when the channel signal light detected to be requested in step S204 belongs to the L band, the optimal RF frequency needed to select the reference signal light B obtained in step S208 is used. When the channel signal light detected to be requested in step S204 belongs to the S or C band, the optimal RF frequency needed to select the reference signal light B obtained in step S208. Furthermore, the respective wavelengths of the reference signal light A and B, which are in advance provided to the control unit 55, the wavelength of the channel signal light detected to be requested in step S204, and the relationship between the change of frequency of the RF signal to be applied to the optical tunable filter 51 and the change of the wavelength transmission characteristic of the optical tunable filter 51 are used in the computation process. Note that the ratio between the change of the frequency of this RF signal and the change of the wavelength transmission characteristic is assumed constant.

This computation process is described in detail below. Firstly, the difference in wavelength between the reference signal light A or B and the channel signal light detected to be requested in step S204 is computed and the change in frequency of the RF signal needed to shift the wavelength transmission characteristic of the optical tunable filter 51 by this wavelength difference is computed by simple proportion. Then, the frequency of the RF signal to be applied to the optical tunable filter 51 needed to select the requested channel signal light by adding/subtracting the change in frequency of the RF signal obtained thus to/from the frequency of the RF signal needed to select the reference signal light.

In step S210, the RF signal with the frequency computed thus is applied to the optical tunable filter 51, and in step S211, the frequency of the RF signal is finely changed so that the optical power of the monitor light which is not transmitted through the wavelength stabilizing filter 53 and is detected by the optical detector 54-1 may become a maximum. If the value detected by the optical detector 54-1 in this process is maximized, the control process for enabling the optical tunable filter 51 to select signal light with a desired wavelength terminates, and after that, the application of the RF signal with the frequency is continued.

So far the second example of the selection process has been described. If the frequency of an RF signal to be applied to the optical tunable filter 51 is computed thus, a frequency to be applied to the optical tunable filter 51 can be computed based on reference signal light adjacent to a wavelength band to which channel signal light requested to select regardless of to which the channel signal light requested to select belongs, to the S, C or L band. Therefore, the computed frequency can be determined within the allowable error range, and as a result, the extraction of a signal with a wavelength different from a desired one can be prevented.

Although in the selection process shown in FIG. 21, the processes in steps S201 through S203 are performed immediately after this selection process, that is, when the optical tunable filter control circuit shown in FIG. 19 is switched on or when this optical tunable filter 51 has not received an instruction to select signal light with a specific wavelength, that is, is a so-called waiting state, the optical tunable filter 51 can select the signal light with a desired wavelength even if the selection procedure is modified so that these processes are performed from the "no" determination in step S205 to the start of the process in step S209. However, according to the procedure shown in FIG. 21, time needed to complete the selection of requested channel signal light can be reduced compared with this procedure if the channel signal light requested to select which is obtained in step S204 belongs to the S or C band. Therefore, the procedure shown in FIG. 21 is useful.

In the selection process shown in FIG. 21, if the channel signal light requested to select belongs to the C band, the determination in step S205 becomes no and the frequency to be applied to the optical tunable filter 51 is computed based on the reference signal light A. However, the determination process in step S205 can also be modified so that the determination may become yes if the channel signal light requested to select belongs to the C band and the frequency to be applied to the optical tunable filter 51 can also be computed based on the reference signal light B.

Furthermore, if channel signal light which belongs to the C band is selected, a linear functional equation indicating the relationship between the respective wavelengths of the two segments of reference signal light and the optimal frequency then can also be computed using both the reference signal light A and B, and the resulted frequencies of an RF signal, optimal for their selection, and a frequency to be applied to the optical tunable filter 51 can also be computed by assigning the frequency of the channel signal light requested to select to the functional equation.

Besides the present invention is not limited to the above-mentioned preferred embodiments, and a variety of improvements/modifications are possible as long as they do not deviate from the subject matter of the present invention.

As described above, according to the present invention, when extracting a signal with a desired wavelength from a WDM signal using an optical tunable filter, the optical tunable filter can be controlled so that a signal with a wavelength different from a desired one may not be wrongly extracted.

What is claimed is:

1. An optical transmission device, comprising:
    an optical tunable filter which transmits and extracts signal light with a specific wavelength from signal light multiplexed by a wavelength-division multiplexing (WDM) method and whose wavelength transmission characteristic varies depending on a control signal;
    a light transmission filter to which signal light extracted by the optical tunable filter is inputted and which has a wavelength transmission characteristic curve that has its peak in a wavelength located between a first continuous set band and a second continuous set band longer in wavelength than the first set band, and that linearly drops from the peak toward a shorter wavelength side than the first set band and also toward a longer wavelength side than the second set band;

a first optical strength detecting unit detecting strength of light transmitted through said light transmission filter; and a second optical strength detecting unit detecting the strength of reflected light which is extracted from said light transmission filter when signal light is inputted to said light transmission filter and which has a reflection characteristic, being the reversal of the wavelength transmission characteristic provided to light transmitted through said light transmission filter; and a control signal generating unit generating a control signal needed to enable the optical tunable filter to extract the signal light with a desired wavelength, based on respective strength detected by the first and second optical strength detecting units.

2. The optical transmission device according to claim 1, wherein the first set band is a wavelength band between 1,525 nm and 1,565 nm;

the second set band is a wavelength band between 1,570 nm and 1,610 nm; and the peak of the wavelength transmission characteristic curve exists between 1,565 nm and 1,570 nm.

3. The optical transmission device according to claim 1, wherein said light transmission filter further has a wavelength transmission characteristic of blocking signals out of a wavelength band in which the multiplexed signal light is inputted to said optical tunable filter.

4. The optical transmission device according to claim 1, further comprising:

a storage unit storing information indicating the wavelength transmission characteristic of said light transmission filter, wherein said control signal generating unit generates the control signal, based on both respective optical strength detected by said first and second optical strength detecting units and information stored in the storage unit.

5. The optical transmission device according to claim 4, further comprising:

a third optical strength detecting unit detecting strength of light transmitted through said optical tunable filter, wherein said control signal generating unit generates the control signal, based on both respective optical strength detected by said first, second, and third optical strength detecting units and information stored in the storage unit.

6. The optical transmission device according to claim 1, further comprising:

a storage unit storing respective information indicating a characteristic of a difference for each wavelength between the wavelength transmission characteristic and the reflection characteristic of said light transmission filter, wherein said control signal generating unit generates the control signal, based on both a difference in strength between respective optical strength detected by said first and second optical strength detecting units, and information stored in the storage unit.

7. An optical transmission device, comprising:

an optical tunable filter which transmits and extracts signal light with a specific wavelength from signal light multiplexed by a wavelength-division multiplexing (WDM) method and whose wavelength transmission characteristic varies depending on a control signal;

a light transmission filter to which signal light extracted by the optical tunable filter is inputted and which has a wavelength transmission characteristic curve that has its peak in a wavelength located between a first continuous set band and a second continuous set band longer in wavelength than the first set band, and that linearly drops from the peak toward a shorter wavelength side than the first set band and also toward a longer wavelength side than the second set band; and a control signal generating unit generating a control signal needed to enable the optical tunable filter to extract the signal light with a desired wavelength, based on the light transmitted through the light transmission filter, wherein said light transmission filter further has a wavelength transmission characteristic curve that has its bottom in a wavelength located between the first set band and a third continuous set band shorter in wavelength than the first set band and that linearly rises from the bottom toward the peak in a wavelength located between the first and second set bands and also toward the shorter wavelength side than the third set band.

8. The optical transmission device according to claim 7, wherein the first set band is a wavelength band between 1,525 nm and 1,565 nm;

the second set band is a wavelength band between 1,570 nm and 1,610 nm; and the third set band is a wavelength band between 1,480 nm and 1,520 nm, wherein the peak of the wavelength transmission characteristic curve in a wavelength located between the first and second set bands exists between 1,565 nm and 1,570 nm and the bottom of the wavelength transmission characteristic curve in a wavelength located between the first and third set bands exists between 1,520 nm and 1,525 nm.

9. The optical transmission device according to claim 7, further comprising a first optical strength detecting unit detecting the optical strength of light transmitted through said light transmission filter; and a storage unit storing information indicating the wavelength transmission characteristic of said light transmission filter, wherein said control signal generating unit generates the control signal, based on both optical strength detected by said first optical strength detecting unit and information stored in the storage unit.

10. The optical transmission device according to claim 9, further comprising a second optical strength detecting unit detecting strength of light transmitted through said optical tunable filter, wherein said control signal generating unit generates the control signal, based on both respective optical strength detected by said first and second optical strength detecting units and information stored in the storage unit.

11. A control method of an optical tunable filter, comprising:

detecting strength of light transmitted through a light transmission filter to which signal light, extracted by the optical tunable filter which transmits and extracts signal light with a specific wavelength from signal light multiplexed by a wavelength-division multiplexing (WDM) method and whose wavelength transmission characteristic curve varies depending on a control signal, is inputted and which has a wavelength transmission characteristic curve that has its peak in a wavelength located between a first continuous set band and a second continuous set band longer in wavelength than the first set band and that linearly drops from the peak toward a shorter wavelength side than the first set band and also toward a longer wavelength side than the second set band;

detecting strength of reflected light which is extracted from the light transmission filter when signal light is inputted to the light transmission filter and which has a reflection characteristic, being the reversal of the wavelength transmission characteristic provided to light transmitted through the light transmission filter; and generating the control signal needed to enable the optical tunable filter to extract signal light with a predetermined wavelength, based on the detected strength of light transmitted through the light transmission filter and the detected strength of reflected light which is extracted from the light transmission filter.

12. A control method of an optical tunable filter, comprising:

detecting light transmitted through a light transmission filter to which signal light, extracted by the optical tunable filter which transmits and extracts signal light with a specific wavelength from signal light multiplexed by a wavelength-division multiplexing (WDM) method and whose wavelength transmission characteristic curve varies depending on a control signal, is inputted and which has a wavelength transmission characteristic curve that has its peak in a wavelength located between a first continuous set band and a second continuous set band longer in wavelength than the first set band and that linearly drops from the peak toward a shorter wavelength side than the first set band and also toward a longer wavelength side than the second set band; and generating the control signal needed to enable the optical tunable filter to extract signal light with a predetermined wavelength, based on the detected result, wherein said light transmission filter further has a wavelength transmission characteristic curve that has its bottom in a wavelength located between the first set band and a third continuous set band shorter in wavelength than the first set band and that linearly rises from the bottom toward the peak in a wavelength located between the first and second set bands and also toward the shorter wavelength side than the third set band.

* * * * *